US012548506B2

(12) United States Patent
Yang et al.

(10) Patent No.: US 12,548,506 B2
(45) Date of Patent: Feb. 10, 2026

(54) ELECTROLUMINESCENT DISPLAY APPARATUS

(71) Applicant: LG Display Co., Ltd., Seoul (KR)

(72) Inventors: Jung Yul Yang, Seoul (KR); Ji Hwan Jung, Seoul (KR); Youn Gyoung Chang, Seoul (KR); Sung Soo Shin, Seoul (KR)

(73) Assignee: LG Display Co., Ltd., Seoul (KR)

( * ) Notice: Subject to any disclaimer, the term of this patent is extended or adjusted under 35 U.S.C. 154(b) by 290 days.

(21) Appl. No.: 17/896,370

(22) Filed: Aug. 26, 2022

(65) Prior Publication Data

US 2023/0154404 A1 May 18, 2023

(30) Foreign Application Priority Data

Nov. 18, 2021 (KR) ........................ 10-2021-0159248

(51) Int. Cl.
*G09G 3/32* (2016.01)
*G09G 3/3233* (2016.01)
(Continued)

(52) U.S. Cl.
CPC ......... *G09G 3/3233* (2013.01); *G09G 3/3266* (2013.01); *G09G 3/3283* (2013.01);
(Continued)

(58) Field of Classification Search
CPC .. G09G 3/3233; G09G 3/3266; G09G 3/3283; G09G 2300/0819;
(Continued)

(56) References Cited

U.S. PATENT DOCUMENTS 10,937,370 B2 * 3/2021 Son ...................... G09G 3/2003
2002/0195968 A1 12/2002 Sanford et al.
(Continued)

FOREIGN PATENT DOCUMENTS

CN 1705004 A 12/2005
CN 102117598 A 7/2011
(Continued)

OTHER PUBLICATIONS

Office Action issued on May 8, 2024 in Chinese Patent Application No. 202211318996.1.
(Continued)

*Primary Examiner* — Lunyi Lao
*Assistant Examiner* — Jarurat Suteerawongsa
(74) *Attorney, Agent, or Firm* — Morgan, Lewis & Bockius LLP

(57) ABSTRACT

An electroluminescent display apparatus may include a display panel including a plurality of pixels, a gate driving circuit driving scan lines and emission lines connected to the plurality of pixels, and a data driving circuit driving data lines connected to the plurality of pixels. A first pixel arranged in an $n^{th}$ (where n is a natural number) pixel row among the pixels included in the display panel of the electroluminescent display apparatus may include a light emitting device, a driving element, a plurality of switch elements, and a storage capacitor.

4 Claims, 27 Drawing Sheets

(51) Int. Cl.
*G09G 3/3266* (2016.01)
*G09G 3/3283* (2016.01)

(52) U.S. Cl.
CPC ............... *G09G 2300/0819* (2013.01); *G09G 2300/0842* (2013.01); *G09G 2310/0289* (2013.01); *G09G 2310/0294* (2013.01); *G09G 2310/08* (2013.01)

(58) Field of Classification Search
CPC ... G09G 2300/0842; G09G 2310/0289; G09G 2310/0294; G09G 2310/08; G09G 2300/0852; G09G 2300/0861; G09G 2310/0251; G09G 2310/0262; G09G 2320/043; G09G 3/3208; G09G 3/3291; G09G 2320/0233; G09G 3/3225; G09G 3/3275; G09G 2300/043; G09G 3/32
See application file for complete search history.

(56) References Cited

U.S. PATENT DOCUMENTS

| | | | | |
|---|---|---|---|---|
| 2005/0264493 | A1 | 12/2005 | Shin | |
| 2011/0157135 | A1 | 6/2011 | Lee et al. | |
| 2012/0050234 | A1* | 3/2012 | Jang | G09G 3/3225 345/204 |
| 2014/0320544 | A1 | 10/2014 | Kim | |
| 2016/0063921 | A1* | 3/2016 | Tsai | G09G 3/3233 345/76 |
| 2016/0063922 | A1* | 3/2016 | Tsai | G09G 3/3291 345/76 |
| 2016/0351121 | A1 | 12/2016 | Kim et al. | |
| 2016/0351122 | A1 | 12/2016 | Jung et al. | |
| 2016/0351124 | A1 | 12/2016 | Kim et al. | |
| 2017/0092199 | A1* | 3/2017 | Park | G09G 3/3258 |
| 2017/0092200 | A1 | 3/2017 | Park et al. | |
| 2018/0286307 | A1* | 10/2018 | Kim | G09G 3/3283 |
| 2019/0019455 | A1* | 1/2019 | Chen | G09G 3/3258 |
| 2020/0105193 | A1* | 4/2020 | Qing | G09G 3/3266 |
| 2021/0287610 | A1* | 9/2021 | Kim | G09G 3/3266 |
| 2022/0180819 | A1* | 6/2022 | Ono | G09G 3/3233 |
| 2022/0199020 | A1* | 6/2022 | You | G09G 3/3291 |
| 2023/0133704 | A1 | 5/2023 | Gai et al. | |
| 2024/0054951 | A1* | 2/2024 | Yu | G09G 3/3266 |

FOREIGN PATENT DOCUMENTS

| | | | |
|---|---|---|---|
| CN | 106205486 | A | 12/2016 |
| CN | 106205490 | A | 12/2016 |
| CN | 112735314 | A | 4/2021 |
| KR | 10-2006-0024869 | A | 3/2006 |
| KR | 10-2020-0080787 | A | 7/2020 |
| KR | 10-2021-0114593 | A | 9/2021 |

OTHER PUBLICATIONS

Office Action issued on Feb. 21, 2025 in Korean Patent Application No. 10-2021-0159248.

* cited by examiner

| | X1 | X2 | X3 | X4 |
|---|---|---|---|---|
| A | VDDEL | Vdata+Vth | Vdata+Vth-ΔVss | Vdata+Vth-ΔVss+Voled-Vinit |
| D | Voled(F) | Vdata | Vdata | Voled |
| C | Vinit | Vinit | Vinit | Voled |

| | X1 | X0 | X2 | X3 | X4 |
|---|---|---|---|---|---|
| A | VDDEL | VDDEL | Vdata+Vth | Vdata+Vth-ΔVss | Vdata+Vth-ΔVss+Voled-Vinit |
| D | Voled(F) | Vdata(P) | Vdata | Vdata | Voled |
| C | Vinit | Vinit | Vinit | Vinit | Voled |

| | X1 | X2 | X3 | X4 |
|---|---|---|---|---|
| A | VDDEL | Vdata'+Vth | Vdata'+Vth-ΔVss | Vdata'+Vth-ΔVss+Voled-Vinit-Vc1 |
| D | Voled(F) | Vdata | Vdata' | Voled |
| C | Vinit | Vinit | Vinit | Voled |

Vdata < Vdata'

| | X1 | X0 | X2 | X3 | X4 |
|---|---|---|---|---|---|
| A | VDDEL | VDDEL | Vdata'+Vth+Vc2 | Vdata"+ Vth-ΔVss | Vdata"+Vth-ΔVss+Voled-Vinit |
| D | Voled(F) | Vdata(P) | Vdata | Vdata" | Voled |
| C | Vinit | Vinit | Vinit | Vinit | Voled |

Vdata < Vdata" < Vdata'

ELECTROLUMINESCENT DISPLAY APPARATUS

CROSS-REFERENCE TO RELATED APPLICATION

This application claims the benefit of and priority to Korean Patent Application No. 10-2021-0159248 filed on Nov. 18, 2021, the entirety of which is incorporated herein by reference for all purposes as if fully set forth herein.

BACKGROUND

1. Technical Field

The present disclosure relates to an apparatus and particularly to, for example, without limitation, an electroluminescent display apparatus.

2. Discussion of the Related Art

Electroluminescent display apparatuses may include a plurality of pixels arranged as a matrix and supply pixels with image data synchronized with a scan signal, and thus, the pixels may produce light with luminance corresponding to the image data. Each of the plurality of pixels may include a driving element, which generates a driving current corresponding to image data, and a light emitting device, which emits light having brightness proportional to a level of the driving current.

The level of the driving current may be determined based on a gate-source voltage of the driving element and a threshold voltage of the driving element. However, in the pixels, the threshold voltage of the driving element may be shifted due to a deviation in the pixel manufacturing process and a deviation in the amount of degradation experienced by the driving element over time.

The luminance generated by the pixels may be proportional to the level of the driving current. As a result, when the threshold voltage of the driving element differs between the pixels, and the level of the driving current corresponding to the same image data differs in the pixels, these differences can cause a deviation in luminance between the pixels. Such a luminance deviation can degrade the display quality.

The description provided in the discussion of the related art section should not be assumed to be prior art merely because it is mentioned in or associated with that section. The discussion of the related art section may include information that describes one or more aspects of the subject technology.

SUMMARY

To overcome the aforementioned problems and other disadvantages of the related art, the present disclosure may provide an electroluminescent display apparatus which compensates for a threshold voltage deviation between pixels to enhance the display quality.

To achieve these objects and other advantages and in accordance with the purpose of the disclosure, as embodied and broadly described herein, an electroluminescent display apparatus according to one or more example embodiments of the present disclosure may include a display panel including a plurality of pixels, a gate driving circuit configured to drive scan lines and emission lines connected to the plurality of pixels, and a data driving circuit configured to drive data lines connected to the plurality of pixels.

A first pixel of the plurality of pixels included in the display panel of the electroluminescent display apparatus may include a light emitting device, a driving element, a plurality of switch elements, and a storage capacitor. The first pixel may be arranged in an $n^{th}$ (where n is a natural number) pixel row among the plurality of pixels.

The light emitting device of the first pixel may be connected to a third node and an input terminal for a low level driving voltage. The driving element of the first pixel may include a gate electrode connected to a first node, a drain electrode connected to a second node, and a source electrode connected to a fourth node, and the driving element may generate a driving current which is to be supplied to the light emitting device. The switch elements of the first pixel may include a first switch element connected between the first node and the second node, a second switch element connected between the third node and an input terminal for an initialization voltage, a third switch element connected between the fourth node and a first data line of the data lines, a fourth switch element connected between the second node and an input terminal for a high level driving voltage, and a fifth switch element connected between the fourth node and the third node. Furthermore, the storage capacitor of the first pixel may be connected between the first node and the third node.

Other apparatuses, devices, methods, features and advantages will be, or will become, apparent to one with skill in the art upon examination of the following figures and detailed description. It is intended that all such additional apparatuses, devices, methods, features and advantages be included within this description, be within the scope of the present disclosure, and be protected by the following claims. Nothing in this section should be taken as a limitation on those claims. Further aspects and advantages are discussed below in conjunction with embodiments of the disclosure.

It is to be understood that both the foregoing description and the following description of the present disclosure are exemplary and explanatory, and are intended to provide further explanation of the disclosure as claimed.

BRIEF DESCRIPTION OF THE DRAWINGS

The accompanying drawings, which are included to provide a further understanding of the disclosure, are incorporated in and constitute a part of this disclosure, illustrate embodiments of the disclosure, and together with the description serve to explain principles of the disclosure. In the drawings.

Figure 1:
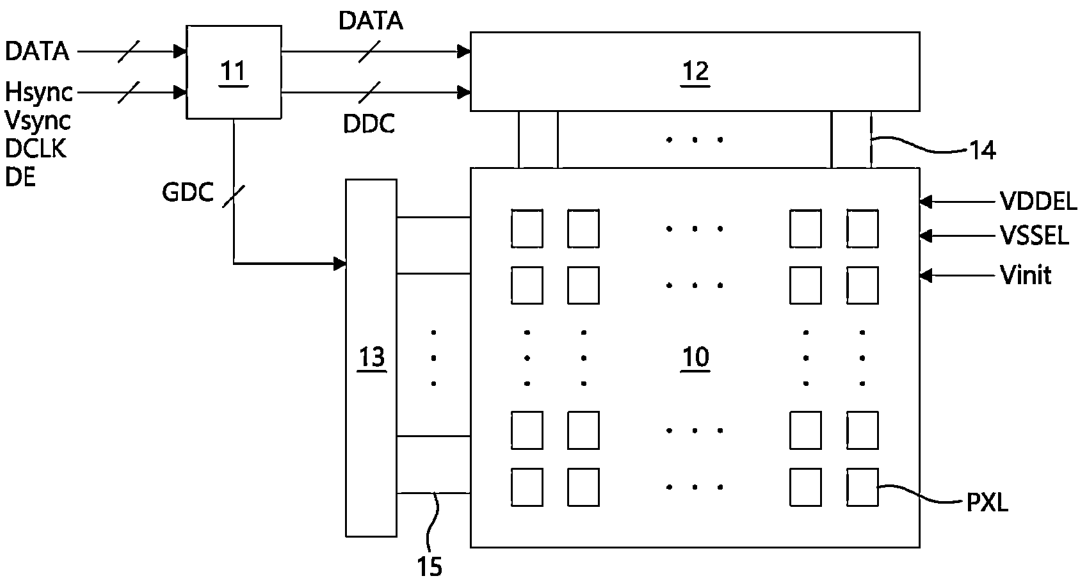
FIG. 1 is a diagram illustrating an electroluminescent display apparatus according to an example embodiment of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference is now made in detail to embodiments of the present disclosure, examples of which may be illustrated in the accompanying drawings. In the following description, when a detailed description of well-known functions or configurations may unnecessarily obscure aspects of the present disclosure, the detailed description thereof may be omitted. The progression of processing steps and/or operations described is an example; however, the sequence of steps and/or operations is not limited to that set forth herein and may be changed, with the exception of steps and/or operations necessarily occurring in a particular order.

Advantages and features of the present disclosure, and implementation methods thereof, are clarified through following embodiments described with reference to the accompanying drawings. The present disclosure may, however, be embodied in different forms and should not be construed as limited to the embodiments set forth herein. Rather, these embodiments are provided so that this disclosure is thorough and complete, and fully conveys the scope of the present disclosure to those skilled in the art. Furthermore, the present disclosure is only defined by the scope of the claims and their equivalents.

The shapes, sizes, areas, ratios, angles, numbers, and the like disclosed in the drawings for describing embodiments of the present disclosure are merely examples, and the present disclosure is not limited thereto. Like reference numerals refer to like elements throughout unless stated otherwise. Throughout this specification, the same elements are denoted by the same reference numerals unless stated otherwise. Names of the respective elements used in the following explanations are selected only for convenience and may be thus different from those used in actual products.

When the term "comprise," "have," "include," "contain," "constitute," "make up of," "formed of," or the like is used, one or more other elements may be added unless a term such as "only" or the like is used. The terms of a singular form may include plural forms unless the context clearly indicates otherwise. The word "exemplary" is used to mean serving as an example or illustration. Any implementation described herein as an "example" is not necessarily to be construed as preferred or advantageous over other implementations.

In construing an element, the element is construed as including an error or tolerance range even where no explicit description of such an error or tolerance range is provided.

Where positional relationships are described, for example, where the positional relationship between two parts is described using "on," "over," "under," "above," "below," "beneath," "near," "close to," or "adjacent to," "beside," "next to," or the like, one or more other parts may be located between the two parts unless a more limiting term, such as "immediate(ly)," "direct(ly)," or "close(ly)," is used. For example, when a structure is described as being positioned "on," "over," "under," "above," "below," "beneath," "near," "close to," or "adjacent to," "beside," or "next to" another structure, this description should be construed as including a case in which the structures contact each other as well as a case in which one or more additional structures are disposed or interposed therebetween. Furthermore, the terms "front," "rear," "back," "left," "right," "top," "bottom," "downward," "upward," "upper," "lower,"

"up," "down," "column," "row," "vertical," "horizontal," and the like refer to an arbitrary frame of reference.

In describing a temporal relationship, when the temporal order is described as, for example, "after," "subsequent," "next," "before," "preceding," "prior to," or the like, a case that is not continuous may be included unless a more limiting term, such as "just," "immediate(ly)," or "direct (ly)," is used.

It is understood that, although the term "first," "second," or the like may be used herein to describe various elements, these elements should not be limited by these terms. These terms are only used to distinguish one element from another. For example, a first element could be a second element, and, similarly, a second element could be a first element, without departing from the scope of the present disclosure. The terms "first," "second," and the like may be used to distinguish components from each other, but the functions or structures of the components are not limited by ordinal numbers or component names in front of the components.

In describing elements of the present disclosure, the terms "first," "second," "A," "B," "(a)," "(b)," or the like may be used. These terms are intended to identify the corresponding elements from the other elements, and the basis, order, or number of the corresponding elements should not be limited by these terms.

For the expression that an element or layer is "connected," "coupled," or "adhered" to another element or layer, the element or layer can not only be directly connected, coupled, or adhered to another element or layer, but also be indirectly connected, coupled, or adhered to another element or layer with one or more intervening elements or layers disposed or interposed between the elements or layers, unless otherwise specified.

The term "at least one" should be understood as including any and all combinations of one or more of the associated listed items. For example, the meaning of "at least one of a first item, a second item, and a third item" denotes the combination of items proposed from two or more of the first item, the second item, and the third item as well as only one of the first item, the second item, or the third item.

The expression of a first element, a second elements "and/or" a third element should be understood as one of the first, second and third elements or as any or all combinations of the first, second and third elements. By way of example, A, B and/or C can refer to only A; only B; only C; any or some combination of A, B, and C; or all of A, B, and C.

In one or more aspects, the terms "between" and "among" may be used interchangeably simply for convenience. For example, an expression "between a plurality of elements" may be understood as between a plurality of elements or among a plurality of elements. For example, an expression "among a plurality of elements" may be understood as between a plurality of elements or among a plurality of elements. In one or more examples, the number of elements may be two. In one or more examples, the number of elements may be more than two.

Features of various embodiments of the present disclosure may be partially or wholly coupled to or combined with each other and may be variously inter-operated, linked or driven together. The embodiments of the present disclosure may be carried out independently from each other or may be carried out together in a co-dependent or related relationship. In one or more aspects, the components of each apparatus according to various embodiments of the present disclosure are operatively coupled and configured.

Unless otherwise defined, the terms (including technical and scientific terms) used herein have the same meaning as commonly understood by one of ordinary skill in the art to which example embodiments belong. It is further understood that terms, such as those defined in commonly used dictionaries, should be interpreted as having a meaning that is, for example, consistent with their meaning in the context of the relevant art and should not be interpreted in an idealized or overly formal sense unless expressly defined otherwise herein.

In the specification, a pixel circuit and a gate driver provided on a substrate of a display panel may be implemented with a transistor, such as an N metal oxide semiconductor field effect transistor (N MOSFET), but the present disclosure is not limited thereto. A transistor may be a three-electrode element, which includes a gate, a source, and a drain. A source may be an electrode, which supplies a carrier to a transistor. In a thin film transistor (TFT), a carrier may start to flow from a source. A drain may be an electrode, which enables the carrier to flow out from the transistor. In this regard, in an MOSFET, the carrier may flow from a source to a drain. In an N metal oxide semiconductor (NMOS) transistor, because a carrier is a hole, a drain voltage may be higher than a source voltage so that the hole may flow from the source to the drain. In the NMOS transistor, because the hole flows from the drain to the source, a current may flow from the drain to the source. It should be noted that a source and a drain of an MOSFET are not fixed. For example, the source and the drain of the MOSFET may switch based on a voltage applied thereto; hence, a source may be a drain, and a drain may be a source.

Embodiments of the present disclosure are described in detail with reference to the accompanying drawings, in which exemplary embodiments of the disclosure are shown. In adding reference numerals to elements of each of the drawings, although the same elements may be illustrated in other drawings, like reference numerals may refer to like elements unless stated otherwise. In addition, for convenience of description, a scale, size, and thickness of each of the elements illustrated in the accompanying drawings may differ from an actual scale, size, and thickness, and thus, embodiments of the present disclosure are not limited to a scale, size, and thickness illustrated in the drawings.

In the following embodiments, as an example of an electroluminescent display apparatus, an organic light emitting display apparatus including an organic light emitting material may be mainly described. However, the inventive concept is not limited to an organic light emitting display apparatus and may be applied to an inorganic light emitting display apparatus including an inorganic light emitting material. It should be understood that the present disclosure is not limited to the foregoing examples.

FIG. 1 is a diagram illustrating an electroluminescent display apparatus according to an example embodiment of the present disclosure.

Referring to FIG. 1, the electroluminescent display apparatus may include a display panel 10, a timing controller 11, a data driver 12, a gate driver 13, and a power circuit.

A plurality of pixels PXL included in the display panel 10 may be arranged (e.g., as a matrix) to configure a pixel array. In the pixel array, each of the pixels PXL may be connected to a data line 14, a gate line 15, an initialization power line, a high level power line, and a low level power line. Here, the gate line 15 connected to each pixel PXL may include two scan lines and two emission lines. Each pixel PXL may be supplied with a data voltage through the data line 14, scan signals through two scan lines, emission signals through two emission lines, an initialization voltage Vinit through the initialization power line, a high level driving voltage VDDEL through the high level power line, and a low level driving voltage VSSEL through the low level power line. In one or more examples, a high level driving voltage may be higher than a low level driving voltage.

Each pixel PXL may perform a programming operation and an emission operation on the basis of a driving waveform (or a driving signal) based on the scan signals and the emission signals to produce light with luminance corresponding to image data DATA. In this regard, each pixel PXL may include a driving element, which generates a driving current corresponding to the image data DATA, and a light emitting device, which emits light having brightness proportional to a level of the driving current. The driving element included in each pixel PXL may be implemented with an oxide transistor, which is good in leakage current characteristic, but the present disclosure is not limited thereto. The term DATA may sometimes refer to, for example, image data, digital image data, or digital video data.

Each pixel PXL may perform a programming operation for setting the driving current prior to an emission operation at every frame. The programming operation according to an example embodiment may include a first sampling interval for compensating for a threshold voltage deviation of the driving element, and may further include a second sampling interval for compensating for a subthreshold slope deviation of the driving element, thereby preventing the partial detachment of a black gray level and a smear phenomenon caused by a defect issue (i.e., insufficiency of a sampling time) occurring when the electron mobility of the driving element is low. The programming operation according to an example embodiment may further include a pre-bias interval preceding the first sampling interval, and in this case, a hysteresis deviation of the driving element may be reduced, and a threshold voltage deviation and a subthreshold slope deviation of the driving element may be more accurately compensated for.

The initialization voltage Vinit may be for preventing the light emitting device from emitting undesired light in the programming operation and may be selected within a voltage range which is sufficiently lower than a voltage of the light emitting device during its operation, and for example, may be selected as a voltage near the low level driving voltage VSSEL. A voltage of the light emitting device during its operation may be sometimes referred to as an operation point voltage.

The timing controller 11 may align digital video data DATA input from the outside on the basis of a resolution of the display panel 10 and may supply aligned image data to the data driver 12. In addition, the timing controller 11 may generate a data control signal DDC for controlling an operation timing of the data driver 12 and a gate control signal GDC for controlling an operation timing of the gate driver 13, on the basis of timing signals such as a vertical synchronization signal Vsync, a horizontal synchronization signal Hsync, a dot clock signal DCLK, and a data enable signal DE.

The data driver 12 may convert the digital image data DATA input from the timing controller 11 into analog data voltages on the basis of the data control signal DDC. The data driver 12 may output the data voltages to the data lines 14 of the display panel 10.

The gate driver 13 may generate gate signals on the basis of the gate control signal GDC. The gate signals may include the scan signals and the emission signals. The gate driver 13 may output the gate signals to the gate lines 15 of the display panel 10. The gate driver 13 may be directly provided in a bezel area of the display panel 10 on the basis of a gate driver in panel (GIP) type. Here, the bezel area may correspond to a non-display area outside a screen area including the pixel array. In one or more aspects, a bezel area may not display an image.

Figure 2:
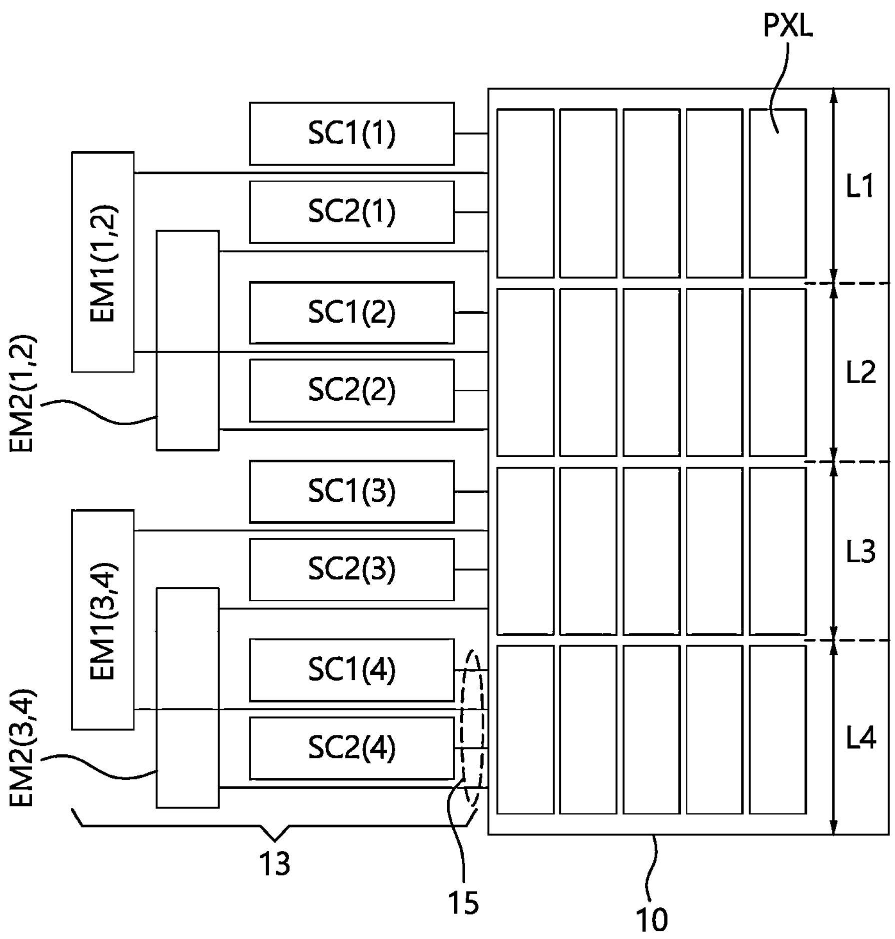
FIG. 2 is an example of a diagram illustrating a connection configuration between a display panel and a gate driver of FIG. 1.

FIG. 2 is an example of a diagram illustrating a connection configuration between the display panel and the gate driver of FIG. 1.

Referring to FIG. 2, the gate driver 13 may include first scan stages SC1(1) to SC1(4) which generate first scan signals having phases which are sequentially delayed, second scan stages SC2(1) to SC2(4) which generate second scan signals having phases which are sequentially delayed, first emission stages EM1(1,2) and EM1(3,4) which generate first emission signals having phases which are sequentially delayed, and second emission stages EM2(1,2) and EM2(3,4) which generate second emission signals having phases which are sequentially delayed.

The gate driver 13 may be connected to pixel rows L1 to L4 of the display panel 10 through four gate lines 15. The four gate lines 15 may include a first scan line through which the first scan signal is supplied, a second scan line through which the second scan signal is supplied, a first emission line through which the first emission signal is supplied, and a second emission line through which the second emission signal is supplied.

In order to decrease a size of the bezel area where the gate driver 13 is provided, one first emission stage may drive two pixel rows, and one second emission stage may drive two pixel rows. To this end, the emission stage EM1(1,2) may be connected to first and second pixel rows L1 and L2 in common and the emission stage EM1(3,4) may be connected to third and fourth pixel rows L3 and L4 in common, and thus, the first emission signals having the same phase may be supplied to two adjacent pixel row units. In addition, the emission stage EM2(1,2) may be connected to the first and second pixel rows L1 and L2 in common and the emission stage EM2(3,4) may be connected to the third and fourth pixel rows L3 and L4 in common, and thus, the second emission signals having the same phase may be supplied to two adjacent pixel row units.

Furthermore, each of the first scan stages SC1(1) to SC1(4) may individually drive a pixel row one by one (e.g., drive a respective pixel row), and each of the second scan stages SC2(1) to SC2(4) may individually drive a pixel row one by one (e.g., drive a respective pixel row), and thus, the first scan signals having different phases may be supplied to two adjacent pixel rows, and the second scan signals having different phases may be supplied to two adjacent pixel rows.

According to a connection configuration of FIG. 2, the number of first emission stages may be half of the number of pixel rows, and the number of second emission stages may be half of the number of pixel rows, and thus, a narrow bezel may be easily and advantageously implemented.

Figure 3:
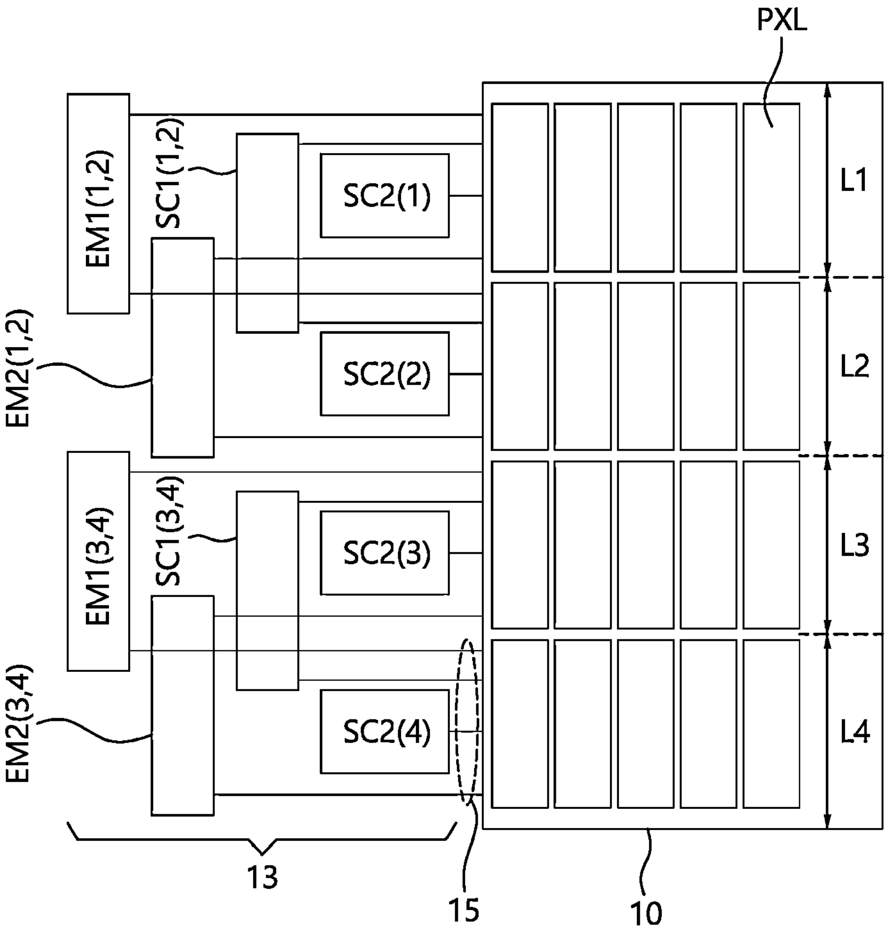
FIG. 3 is an example of a diagram illustrating another connection configuration between the display panel and the gate driver of FIG. 1.

FIG. 3 is an example of a diagram illustrating another connection configuration between the display panel and the gate driver of FIG. 1.

Referring to FIG. 3, the gate driver 13 may include first scan stages SC1(1,2) and SC1(3,4) which generate first scan signals having phases which are sequentially delayed, second scan stages SC2(1) to SC2(4) which generate second scan signals having phases which are sequentially delayed, first emission stages EM1(1,2) and EM1(3,4) which generate first emission signals having phases which are sequentially delayed, and second emission stages EM2(1,2) and EM2(3,4) which generate second emission signals having phases which are sequentially delayed.

The gate driver 13 may be connected to pixel rows L1 to L4 of the display panel 10 through four gate lines 15. The four gate lines 15 may include a first scan line through which the first scan signal is supplied, a second scan line through which the second scan signal is supplied, a first emission line through which the first emission signal is supplied, and a second emission line through which the second emission signal is supplied.

In order to further decrease a size of the bezel area where the gate driver 13 is provided, one first scan stage may drive two pixel rows, one first emission stage may drive two pixel rows, and one second emission stage may drive two pixel rows.

In this regard, the first scan stage SC1(1,2) may be connected to first and second pixel rows L1 and L2 in common and the second scan stage SC1(3,4) may be connected to third and fourth pixel rows L3 and L4 in common, and thus, the first scan signals having the same phase may be supplied to two adjacent pixel row units.

Moreover, the emission stage EM1(1,2) may be connected to first and second pixel rows L1 and L2 in common, and the emission stage EM1(3,4) may be connected to third and fourth pixel rows L3 and L4 in common, and thus, the first emission signals having the same phase may be supplied to two adjacent pixel row units. In addition, the emission stage EM2(1,2) may be connected to the first and second pixel rows L1 and L2 in common, and the emission stage EM2(3,4) may be connected to the third and fourth pixel rows L3 and L4 in common, and thus, the second emission signals having the same phase may be supplied to two adjacent pixel row units.

Furthermore, each of the second scan stages SC2(1) to SC2(4) may individually drive a pixel row one by one (e.g., drive a respective pixel row), and thus, the second scan signals having different phases may be supplied to two adjacent pixel rows.

According to a connection configuration of FIG. 3, the number of first scan stages may be half of the number of pixel rows, the number of first emission stages may be half of the number of pixel rows, and the number of second emission stages may be half of the number of pixel rows, and thus, a narrow bezel may be more easily and advantageously implemented.

Figure 4A:
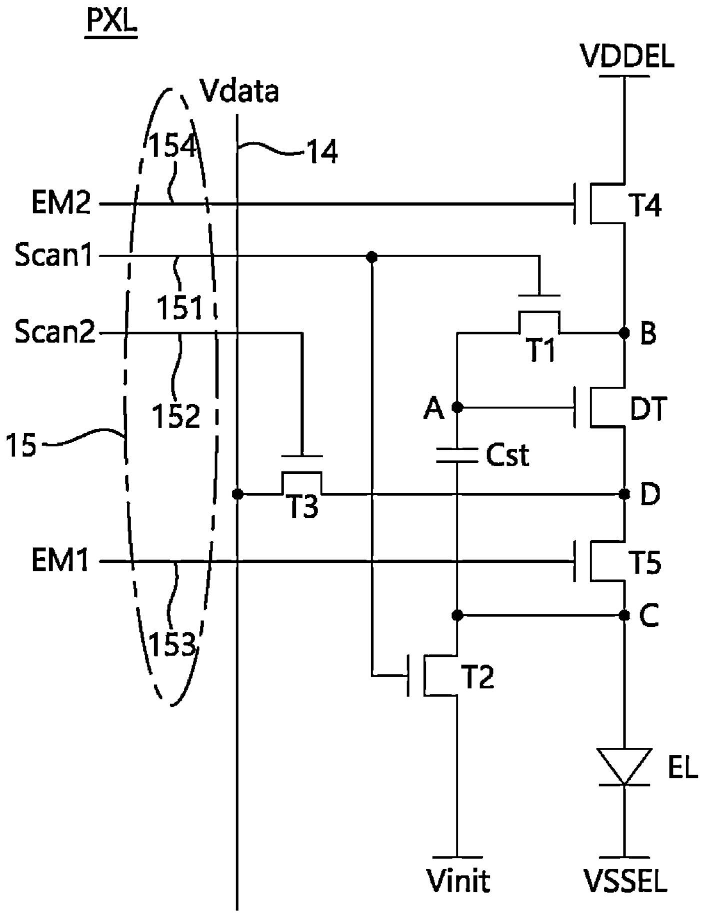
FIG. 4A is an example of a diagram illustrating a circuit configuration of a pixel provided in the display panel of FIG. 1.
Figure 4B:
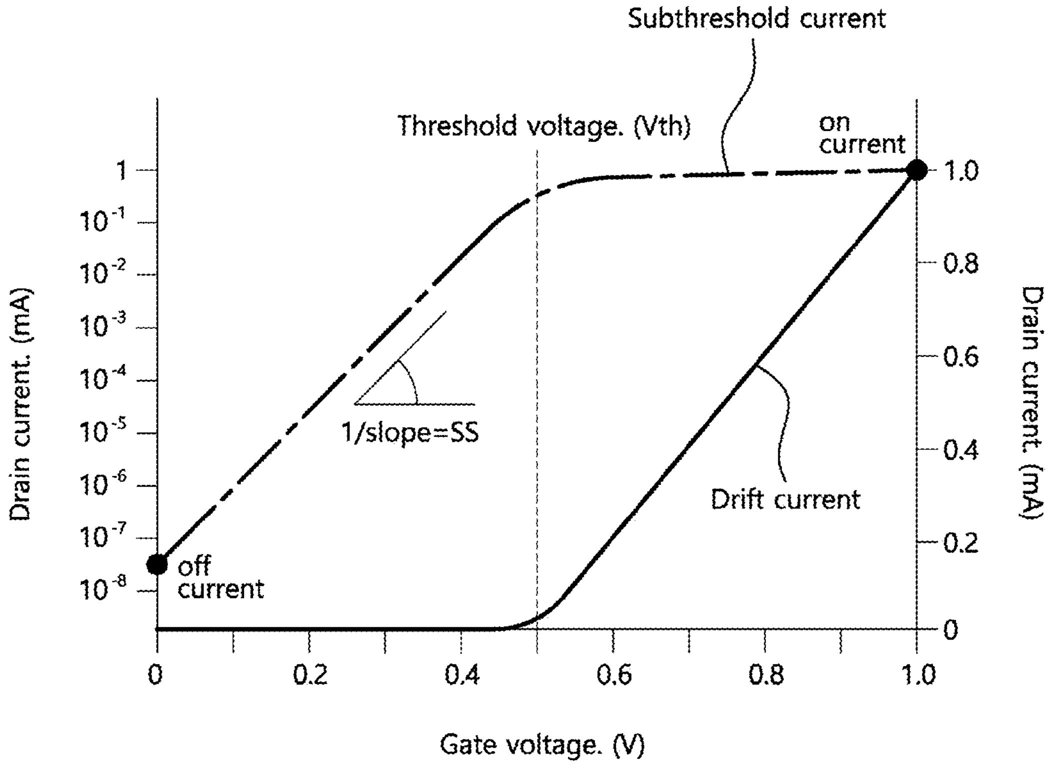
FIG. 4B is an example of a diagram illustrating a characteristic curve of a driving element included in the pixel of FIG. 4A.

FIG. 4A is an example of a diagram illustrating a circuit configuration of a pixel provided in the display panel of FIG. 1, and FIG. 4B is an example of a diagram illustrating a characteristic curve of a driving element included in the pixel of FIG. 4A.

Referring to FIG. 4A, a first pixel PXL of a plurality of pixels arranged in an $n^{th}$ (where n is a natural number) pixel row is illustrated.

The first pixel PXL may include a light emitting device EL, a driving element DT, first to fifth switch elements T1 to T5, and a storage capacitor Cst.

The light emitting device EL may be implemented with an organic light emitting diode (OLED) which emits light with a driving current supplied through the driving element DT. A multi-layer organic compound layer may be disposed between an anode electrode and a cathode electrode of the light emitting device EL. The organic compound layer may include a hole injection layer (HIL), a hole transport layer (HTL), an emission layer (EML), an electron injection layer (EIL), and an electron transport layer (ETL). The anode electrode of the light emitting device EL may be connected to a node C, and the cathode electrode of the light emitting device EL may be connected to an input terminal for the low level driving voltage VSSEL.

The driving element DT may generate the driving current applied to the light emitting device EL, on the basis of a gate-source voltage thereof. A gate electrode of the driving element DT may be connected to a node A, a drain electrode thereof may be connected to a node B, and a source electrode thereof may be connected to a node D. The driving element DT may be implemented with an MOSFET including an oxide semiconductor layer, but the present disclosure is not limited thereto.

The first switch element T1 may be connected between the node A and the node B and may be turned on/off based on a first scan signal Scan1 from the first scan line 151. A gate electrode of the first switch element T1 may be connected to the first scan line 151.

The second switch element T2 may be connected between an input terminal for the initialization voltage Vinit and the node C and may be turned on/off based on the first scan signal Scan1 from the first scan line 151. A gate electrode of the second switch element T2 may be connected to the first scan line 151.

The third switch element T3 may be connected between the first data line 14 and the node D and may be turned on/off based on a second scan signal Scan2 from the second scan line 152. A gate electrode of the first switch element T1 may be connected to the second scan line 152.

The fourth switch element T4 may be connected between an input terminal for the high level driving voltage VDDEL and the node B and may be turned on/off based on the second emission signal EM2 from the second emission line 154. A gate electrode of the fourth switch element T4 may be connected to the second emission line 154.

The fifth switch element T5 may be connected between the node D and the node C and may be turned on/off based on the first emission signal EM1 from the first emission line 153. A gate electrode of the fifth switch element T5 may be connected to the first emission line 153.

The storage capacitor Cst may be connected between the node A and the node C.

The first pixel PXL may automatically compensate for (which may be referred to as internal compensation) a threshold voltage deviation of the driving element DT through a pixel operation on the basis of the connection configuration. An internal compensation operation may denote that a threshold voltage of the driving element DT is reflected in the gate-source voltage of the driving element DT in a pixel programming operation, and thus, compensation is performed so that the driving current generated by the driving element DT is not affected by a threshold voltage variation of the driving element DT. In one or more examples, a threshold voltage deviation of the driving element DT may refer to a variation or deviation in the threshold voltage of the driving element DT.

In FIG. 4B showing a characteristic curve of the driving element DT, a threshold voltage of the driving element DT is illustrated by 'Vth'. The threshold voltage Vth of the driving element DT may be a gate threshold voltage which enables a drift current to flow in the driving element DT. The characteristic curve of the driving element DT may be divided into a left subthreshold region and a right drift region with respect to the threshold voltage Vth of the driving element DT.

The drift region may be a region where a gate voltage of the driving element DT is greater than the threshold voltage Vth of the driving element DT. In the drift region, as the gate voltage of the driving element DT increases, a drift current may increase up to an on current. Such an on current may be a driving current which is to be supplied to the light emitting device EL The subthreshold region may be a region where the gate voltage of the driving element DT is less than the threshold voltage Vth of the driving element DT. In addition, a leakage current (i.e., a subthreshold current) which is greater than an off current may flow in the subthreshold region, and this may be an MOSFET's unique characteristic. The subthreshold current may have a subthreshold slope (slope=current/voltage). The subthreshold current may have a subthreshold slope. An inverse number (1/slope) of the subthreshold slope may be referred to as a subthreshold swing SS.

A subthreshold characteristic may be a unique characteristic of the driving element DT and may be changed for each pixel. When a subthreshold slope deviation occurs between pixels, the reliability and accuracy of the above-described internal compensation operation may be reduced, and thus, in the present embodiment described below, threshold voltage deviation compensation and subthreshold slope deviation compensation may be further performed in the pixel programming operation by using the driving waveform of FIG. 5 or 8. In one or more examples, a subthreshold slope deviation between pixels may describe a situation in which pixels have different subthreshold slopes.

Figures 5, 6:
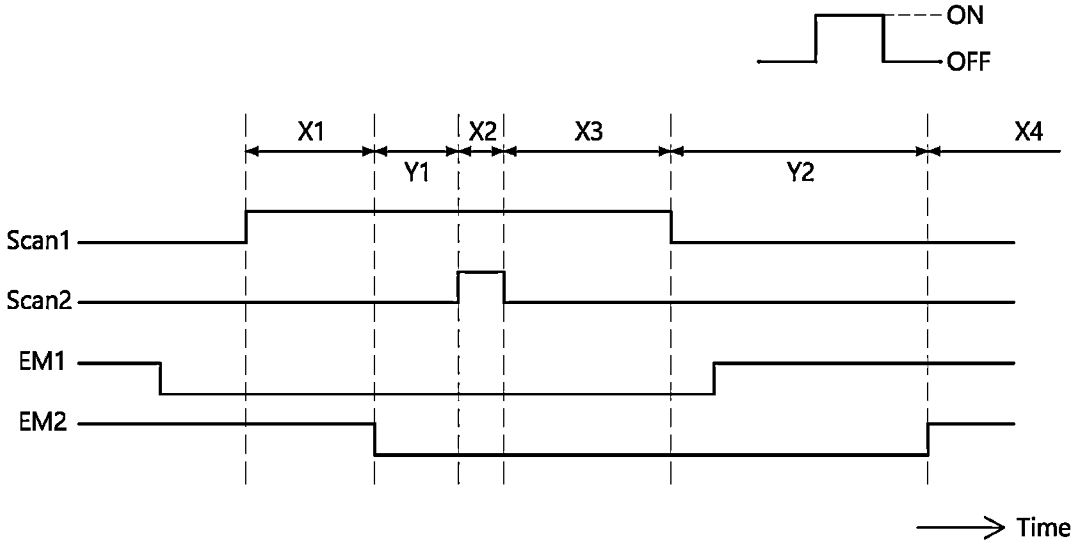
FIG. 5 is an example of a first driving waveform diagram for driving the pixel of FIG. 4A.
FIG. 6 is an example of a diagram illustrating voltages of pixel nodes of FIG. 4A in X1, X2, X3, and X4 of FIG. 5.

FIG. 5 is a first driving waveform diagram for driving the pixel of FIG. 4A. In FIG. 5, X1, X2, X3, Y1, and Y2 are relevant to the above-described pixel programming operation.

Referring to FIG. 5, one frame period for driving the first pixel PXL of FIG. 4A may include an initialization interval X1, a first sampling interval X2, a second sampling interval X3, and an emission interval X4. The one frame period may further include a first transition interval Y1 disposed (e.g., arranged or occurring) between the initialization interval X1 and the first sampling interval X2, and a second transition interval Y2 disposed (e.g., arranged or occurring) between the second sampling interval X3 and the emission interval X4.

In the initialization interval X1, the node A and the node C of the first pixel PXL may be initialized. The first sampling interval X2 may be disposed next to (e.g., may be arranged after, or may occur subsequent to) the initialization interval X1. In the first sampling interval X2, the threshold voltage of the driving element DT of the first pixel PXL may be sampled and stored in the node A.

The second sampling interval X3 may be disposed next to (e.g., may be arranged after, or may occur subsequent to) the first sampling interval X2. In the second sampling interval X3, the subthreshold slope deviation compensation voltage of the driving element DT of the first pixel PXL may be sampled and stored in the node A.

The emission interval X4 may be disposed next to (e.g., may be arranged after, or may occur subsequent to) the second sampling interval X3. In the emission interval X4, a driving current based on the gate-source voltage of the driving element DT of the first pixel PXL may be supplied to the light emitting device EL of the first pixel PXL, and thus, the light emitting device EL may be driven.

Here, the gate-source voltage of the driving element DT of the first pixel PXL may be a difference voltage between a voltage of the node A and a voltage of the node D in the emission interval X4. The gate-source voltage of the driving element DT may include the sampled threshold voltage of the driving element DT, the sampled subthreshold slope deviation compensation voltage of the driving element DT, a data voltage Vdata supplied through the first data line, and the initialization voltage Vinit.

As described above, based on the first driving waveform (or the first driving signal) shown in FIG. 5, the threshold voltage deviation of the driving element DT and the subthreshold slope deviation of the driving element DT may be compensated for in the pixel programming operation. The first driving waveform may be defined (or described) by the first scan signal Scan1 and the second scan signal Scan2, which have different pulse forms and different phases, and the first emission signal EM1 and the second emission signal EM2, which has the same pulse form and different phases.

In detail, the first scan signal Scan1 may have an on level up to the second sampling interval X3 (e.g., to the end of X3) from the initialization interval X1 (e.g., from the beginning of X1), and then, may have an off level up to the emission interval X4 from the second transition interval Y2 (e.g., from the beginning of Y2).

The second scan signal Scan2 may have an off level up to the first transition interval Y1 (e.g., to the end of Y1) from the initialization interval X1 (e.g., from the beginning of X1, or from prior to the beginning of X1), have an on level in the first sampling interval X2 subsequent thereto (e.g., subsequent to Y1), and have an off level up to the emission interval X4 from the second sampling interval X3 (e.g., from the beginning of X3) subsequent thereto (e.g., subsequent to X2).

The first emission signal EM1 may have an off level up to a specific timing of the second transition interval Y2 from the initialization interval X1 (e.g., from the beginning of X1, or from prior to the beginning of X1), and then, may have an on level up to the emission interval X4 from after the specific timing of the second transition interval Y2. In addition, the second emission signal EM2 may have an on level in the initialization interval X1 (e.g., to the end of X1), have an off level up to the second transition interval Y2 (e.g., to the end of Y2) from the first transition interval Y1 (e.g., from the beginning of Y1) subsequent thereto (e.g., subsequent to X1), and have an on level in the emission interval X4 subsequent thereto (e.g., subsequent to Y2).

Figure 7A:
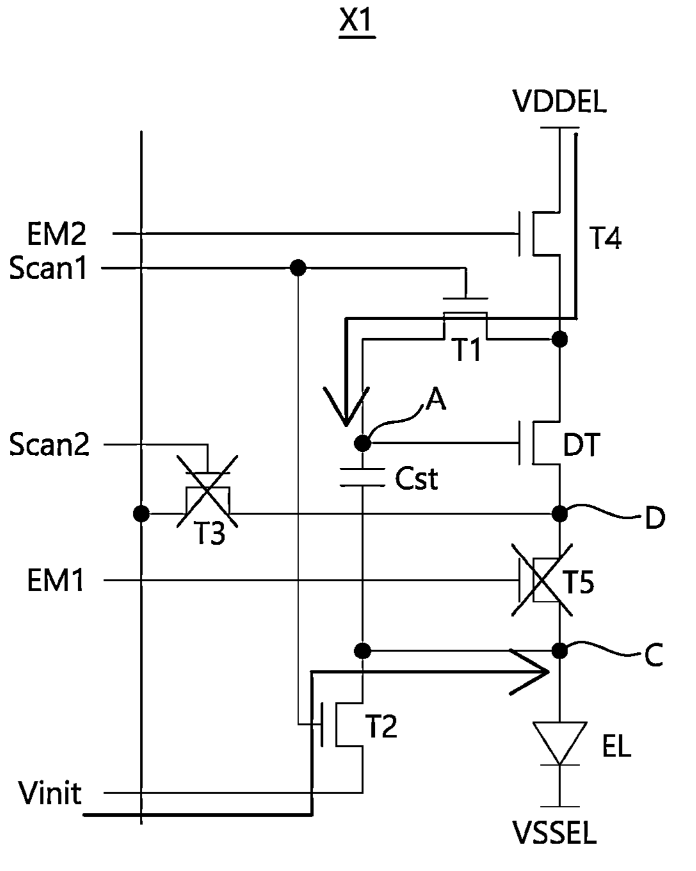
FIG. 7A is an example of a diagram illustrating an operation of the pixel in an initialization interval of FIG. 5.
Figure 7B:
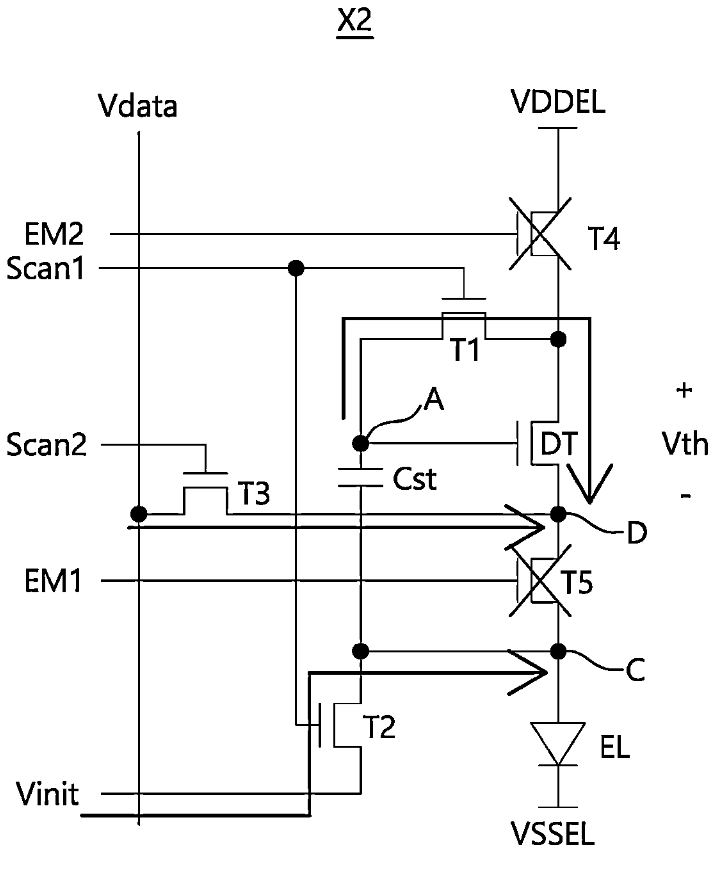
FIG. 7B is an example of a diagram illustrating an operation of the pixel in a first sampling interval of FIG. 5.
Figure 7C:
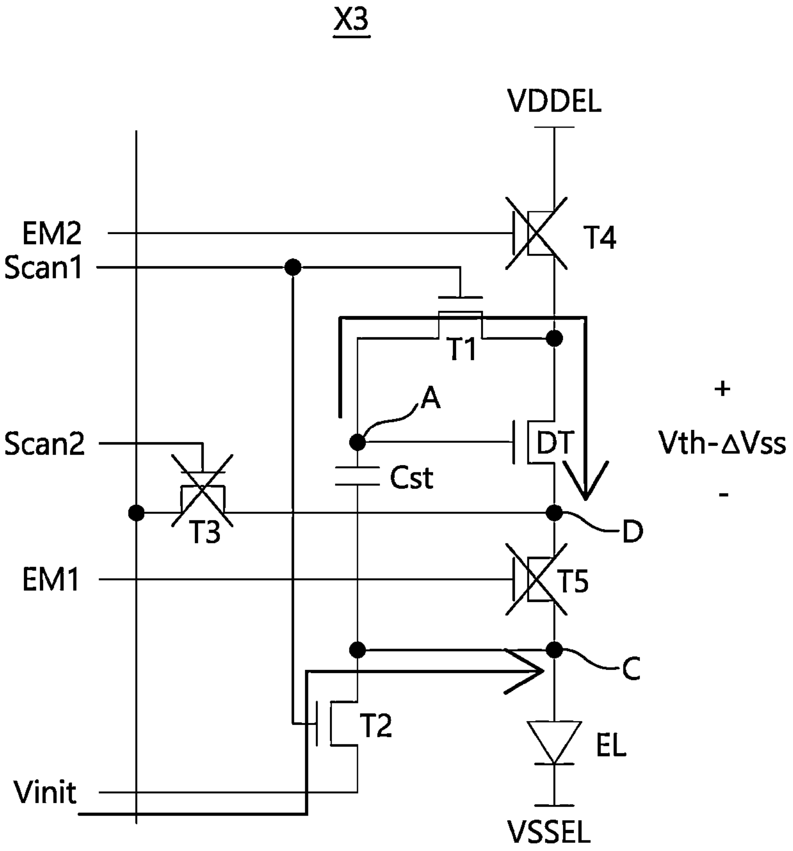
FIG. 7C is an example of a diagram illustrating an operation of the pixel in a second sampling interval of FIG. 5.
Figure 7D:
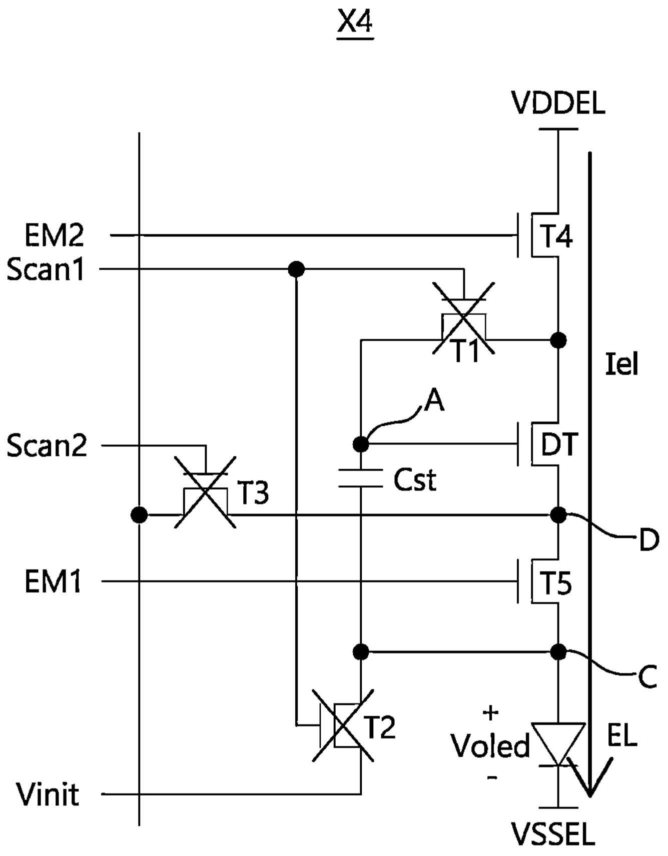
FIG. 7D is an example of a diagram illustrating an operation of the pixel in an emission interval of FIG. 5.

FIG. 6 is an example of a diagram illustrating voltages of pixel nodes of FIG. 4A in X1, X2, X3, and X4 of FIG. 5. FIG. 7A is an example of a diagram illustrating an operation of the pixel in an initialization interval of FIG. 5. FIG. 7B is an example of a diagram illustrating an operation of the pixel in a first sampling interval of FIG. 5. FIG. 7C is an example of a diagram illustrating an operation of the pixel in a second sampling interval of FIG. 5. FIG. 7D is an example of a diagram illustrating an operation of the pixel in an emission interval of FIG. 5.

Referring to FIGS. 6 and 7A, in an initialization interval X1, the first, second, and fourth switch elements T1, T2, and T4 may be turned on, and the third and fifth switch elements T3 and T5 may be turned off. In the initialization interval X1, the node A may be initialized to the high level driving voltage VDDEL, and the node C may be initialized to the initialization voltage Vinit. At this time, the node D may hold an operation point voltage Voled(F) of the light emitting device EL which is stored in a previous frame.

Referring to FIGS. 6 and 7B, in a first sampling interval X2, the first, second, and third switch elements T1, T2, and T3 may be turned on, and the fourth and fifth switch elements T4 and T5 may be turned off. In the first sampling interval X2, a voltage of the node D may be changed to the data voltage Vdata, and a voltage of the node A may be changed to "Vdata+Vth" by the driving element DT which operates as a diode. Here, "Vth" may be a threshold voltage of the light emitting device DT. In addition, a voltage of the node C may maintain the initialization voltage Vinit.

Referring to FIGS. 6 and 7C, in a second sampling interval X3, the first and second switch elements T1 and T2 may be turned on, and the third, fourth, and fifth switch elements T3, T4, and T5 may be turned off. In the second sampling interval X3, a voltage of the node D may maintain the data voltage Vdata, and a voltage of the node A may be changed to "Vdata+Vth−ΔVss" by the driving element DT which operates as a diode. Here, "ΔVss" may be a subthreshold slope deviation compensation voltage of the light emitting device DT. In addition, a voltage of the node C may maintain the initialization voltage Vinit.

Referring to FIGS. 6 and 7D, in an emission interval X4, the first, second, and third switch elements T1, T2, and T3 may be turned off, and the fourth and fifth switch elements T4 and T5 may be turned on. In the emission interval X4, a voltage of the node C and a voltage of the node D may be changed to an operation point voltage Voled of the light emitting device EL, and a voltage of the node A may be changed to "Vdata+Vth−ΔVss+Voled−Vinit" by a coupling operation of the storage capacitor Cst. In one or more aspects, Voled(F) is the operating point voltage of the previous frame, and Voled is the operating point voltage of a current frame.

In the emission interval X4, a driving current Iel supplied to the light emitting device EL may be $K(Vgs-Vth)^2$. Here, K may be a proportional constant which is determined by the electron mobility, parasitic capacitance, and channel capacity of the driving element DT, and Vgs may be a gate-source voltage of the driving element DT (i.e., a difference voltage between a voltage of the node A and a voltage of the node D) in the emission interval X4. A difference voltage may refer to a difference in voltage.

Therefore, in the emission interval X4, the driving current Iel supplied to the light emitting device EL may be $K(Vdata-\Delta Vss-Vinit)^2$. As seen in such an equation, the driving current Iel may not be affected by a variation of the threshold voltage Vth of the driving element DT and may be compensated for to be lower by a subthreshold slope deviation compensation voltage (ΔVss) of the light emitting device DT, and thus, may prevent the partial detachment of a black gray level and a smear phenomenon caused by a defect issue (i.e., insufficiency of a sampling time) which occurs when the electron mobility of the driving element is low.

Figures 8, 9:
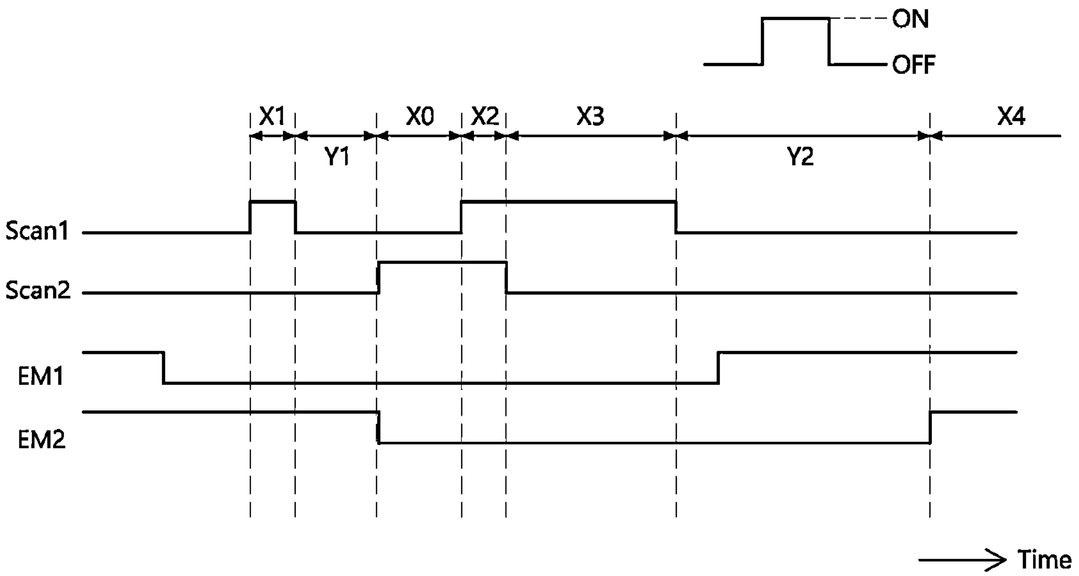
FIG. 8 is an example of a second driving waveform diagram for driving the pixel of FIG. 4A.
FIG. 9 is an example of a diagram illustrating voltages of the pixel nodes of FIG. 4A in X1, X0, X2, X3, and X4 of FIG. 8.

FIG. 8 is a second driving waveform diagram for driving the pixel of FIG. 4A. In FIG. 8, X1, X0, X2, X3, Y1, and Y2 are relevant to the above-described pixel programming operation.

Referring to FIG. 8, one frame period for driving the first pixel PXL of FIG. 4A may include an initialization interval X1, a pre-bias interval X0, a first sampling interval X2, a second sampling interval X3, and an emission interval X4. The one frame period may further include a first transition interval Y1 disposed between the initialization interval X1 and the first sampling interval X2 and a second transition interval Y2 disposed between the second sampling interval X3 and the emission interval X4.

In the initialization interval X1, the node A and the node C of the first pixel PXL may be initialized. The first sampling interval X2 may be disposed next to the initialization interval X1. In the first sampling interval X2, the threshold voltage of the driving element DT of the first pixel PXL may be sampled and stored in the node A.

The pre-bias interval X0 may be disposed between the initialization interval X1 and the first sampling interval X2. In the pre-bias interval X0, a pre-data voltage may be first supplied to the node D, and thus, a hysteresis deviation of the driving element DT of the first pixel PXL may be reduced. The pre-data voltage may be a data voltage applied to a second pixel connected to the first data line. In one or more examples, the first pixel PXL may be one of the pixels arranged (or located) in an $n^{th}$ pixel row of the plurality of pixels PXL in the display panel 10, and n may be a natural number. In an example, the second pixel may be one of the pixels arranged in an $n-1^{th}$ pixel row of the plurality of pixels PXL, and n may be a natural number of 2 or higher. In another example, the second pixel may be one of the pixels arranged in an $n+1^{th}$ pixel row of the plurality of pixels PXL, and n may be a natural number of 1 or higher. In one or more examples, the first pixel PXL may be located in a first pixel row of the plurality of pixels, and the second pixel may be located in a second pixel row of the plurality of pixels, where the first and second pixel rows are adjacent pixel rows (or adjacent rows of pixels). In one or more examples, the first and second pixels may be adjacent pixels. The first pixel PXL and the second pixel may be adjacent pixels which share the first data line.

Because a data voltage applied to the first pixel PXL in the first sampling interval X2 has a level similar to that of a pre-data voltage which is first applied to the second pixel adjacent thereto, when the node D is pre-charged with the pre-data voltage in the pre-bias interval X0 preceding the first sampling interval X2, a hysteresis deviation of the driving element DT of the first pixel PXL may be effectively reduced. The hysteresis deviation of the driving element DT is a driving characteristic deviation caused by a change in a bias voltage applied to a source electrode of the driving element DT connected to the node D.

The second sampling interval X3 may be disposed next to the first sampling interval X2. In the second sampling interval X3, the subthreshold slope deviation compensation voltage of the driving element DT of the first pixel PXL may be sampled and stored in the node A.

The emission interval X4 may be disposed next to the second sampling interval X3. In the emission interval X4, a driving current based on the gate-source voltage of the driving element DT of the first pixel PXL may be supplied to the light emitting device EL of the first pixel PXL, and thus, the light emitting device EL may be driven. Here, the gate-source voltage of the driving element DT of the first pixel PXL may be a difference voltage between a voltage of the node A and a voltage of the node D in the emission interval X4. The gate-source voltage of the driving element DT may include the sampled threshold voltage of the driving element DT, the sampled subthreshold slope deviation compensation voltage of the driving element DT, a data voltage Vdata supplied through the first data line, and the initialization voltage Vinit.

As described above, based on the second driving waveform shown in FIG. 8, the threshold voltage deviation of the driving element DT and the subthreshold slope deviation of the driving element DT may be compensated for in the pixel programming operation, and moreover, a hysteresis deviation of the driving element DT may be reduced. The second driving waveform may be defined (or described) by the first scan signal Scan1 and the second scan signal Scan2, which have different pulse forms and different phases, and the first emission signal EM1 and the second emission signal EM2, which has the same pulse form and different phases.

In detail, the first scan signal Scan1 may have an on level in the initialization interval X1, have an off level in the first transition interval Y1 and the pre-bias interval X0 subsequent thereto, have an on level in the first sampling interval X2 and the second sampling interval X3 subsequent thereto, and have an on level in the second transition interval Y2 and the emission interval X4 subsequent thereto. The second scan signal Scan2 may have an off level in the initialization interval X1 and the first transition interval Y1, have an on level in the pre-bias interval X0 and the first sampling interval X2 subsequent thereto, and have an off level up to the emission interval X4 from the second sampling interval X3 subsequent thereto.

The first emission signal EM1 may have an off level up to a specific timing of the second transition interval Y2 from the initialization interval X1, and then, may have an on level up to the emission interval X4 from after the specific timing of the second transition interval Y2. In addition, the second emission signal EM2 may have an on level in the initialization interval X1 and the first transition interval Y1, have an off level up to the second transition interval Y2 from the pre-bias interval X0 subsequent thereto, and have an on level in the emission interval X4 subsequent thereto.

Figure 10A:
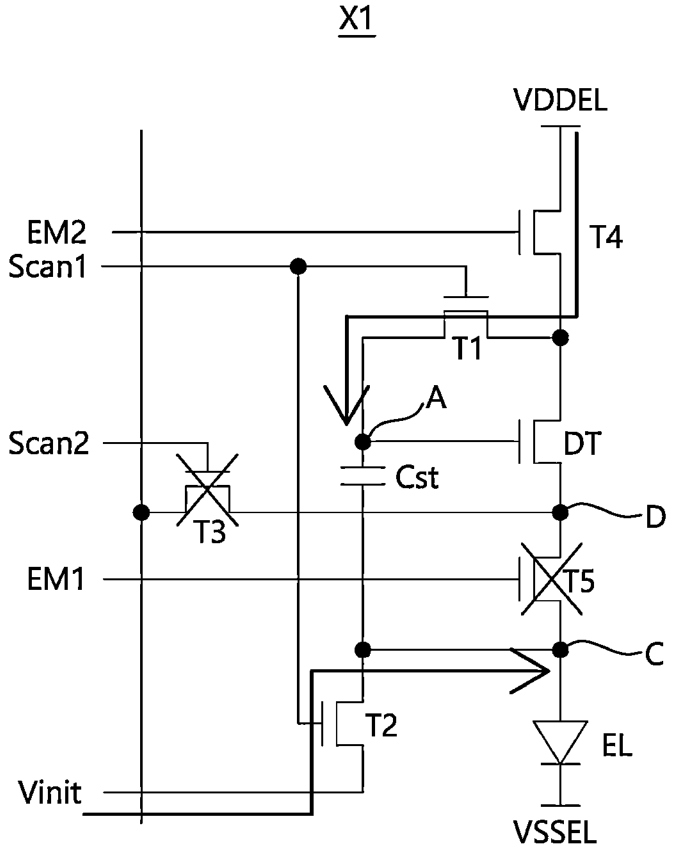
FIG. 10A is an example of a diagram illustrating an operation of the pixel in an initialization interval of FIG. 8.
Figure 10B:
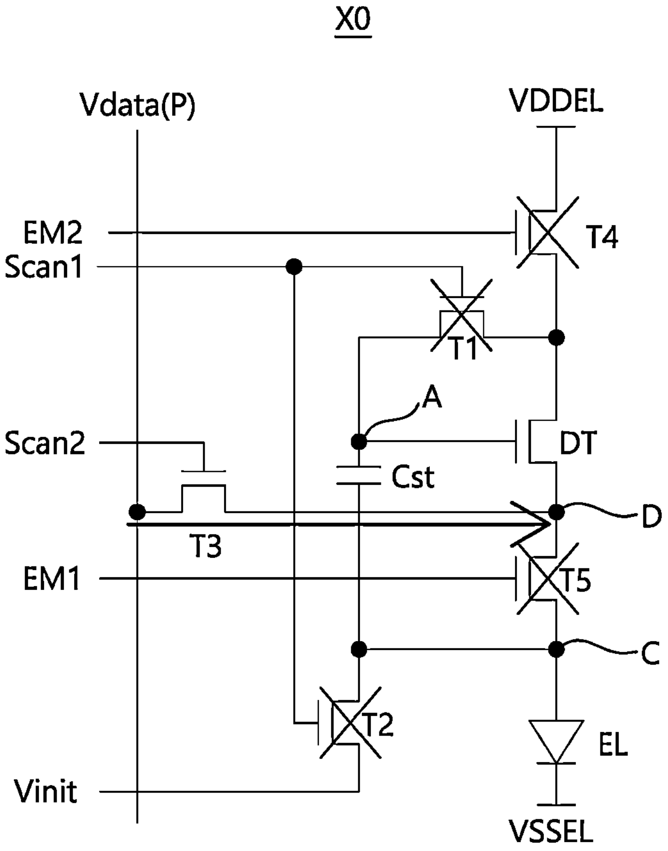
FIG. 10B is an example of a diagram illustrating an operation of the pixel in a pre-bias interval of FIG. 8.
Figure 10C:
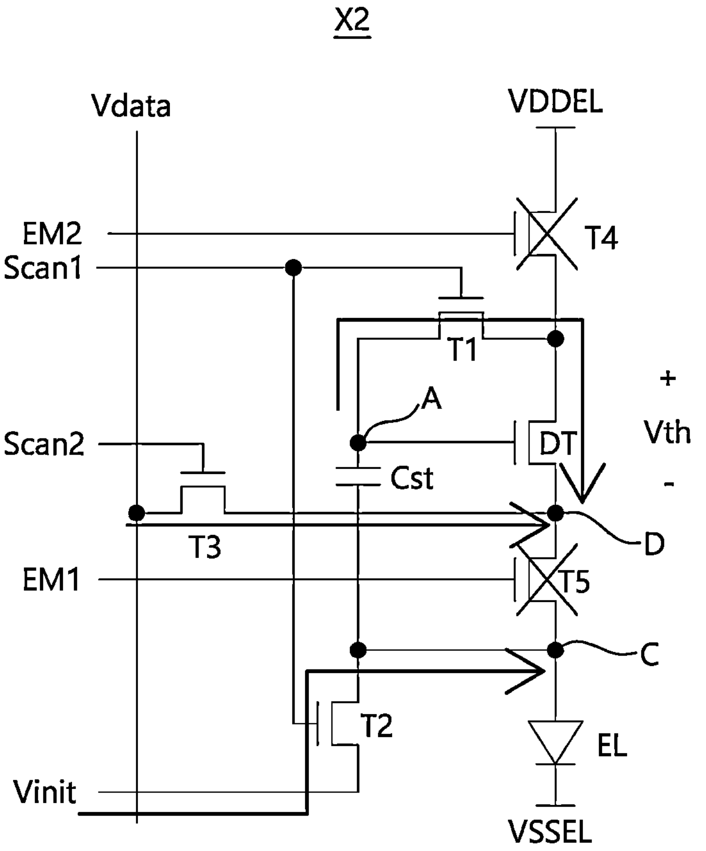
FIG. 10C is an example of a diagram illustrating an operation of the pixel in a first sampling interval of FIG. 8.
Figure 10D:
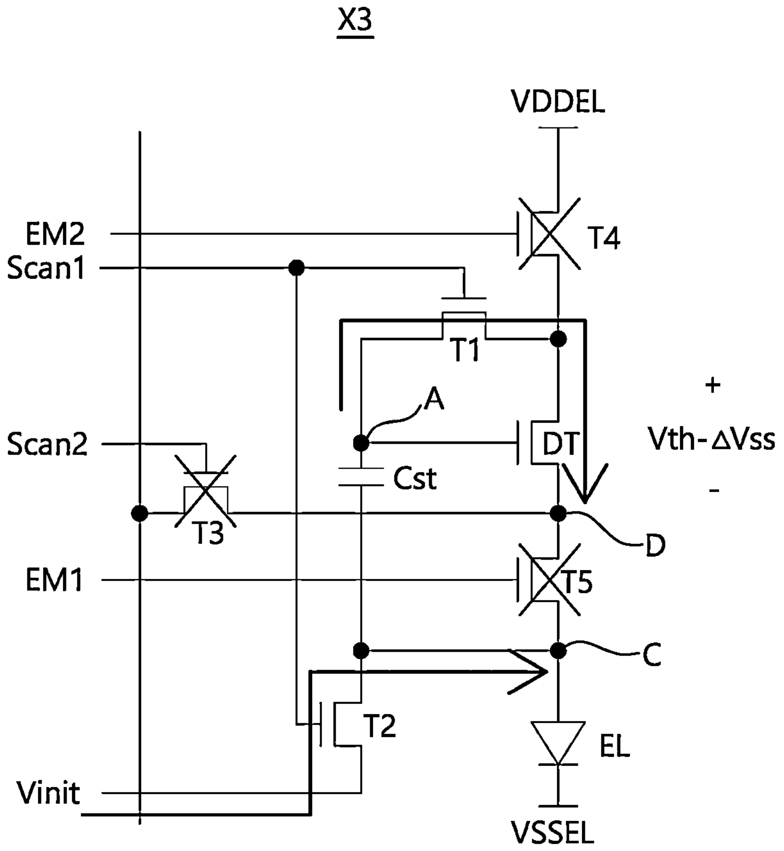
FIG. 10D is an example of a diagram illustrating an operation of the pixel in a second sampling interval of FIG. 8.
Figure 10E:
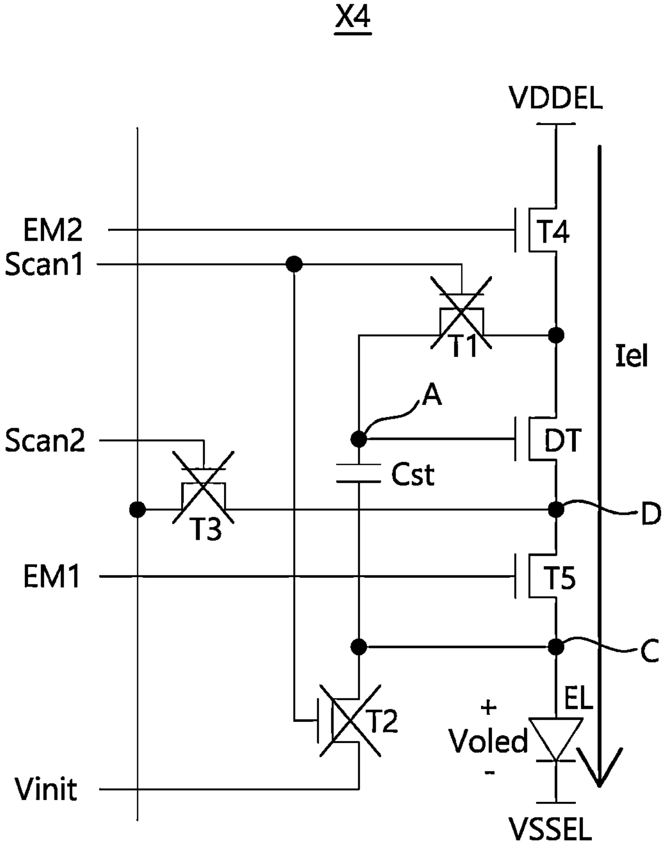
FIG. 10E is an example of a diagram illustrating an operation of the pixel in an emission interval of FIG. 8.

FIG. 9 is an example of a diagram illustrating voltages of the pixel nodes of FIG. 4A in X1, X0, X2, X3, and X4 of FIG. 8. FIG. 10A is an example of a diagram illustrating an operation of the pixel in an initialization interval of FIG. 8. FIG. 10B is an example of a diagram illustrating an operation of the pixel in a pre-bias interval of FIG. 8. FIG. 10C is an example of a diagram illustrating an operation of the pixel in a first sampling interval of FIG. 8. FIG. 10D is an example of a diagram illustrating an operation of the pixel in a second sampling interval of FIG. 8. FIG. 10E is an example of a diagram illustrating an operation of the pixel in an emission interval of FIG. 8.

Referring to FIGS. 9 and 10A, in an initialization interval X1, the first, second, and fourth switch elements T1, T2, and T4 may be turned on, and the third and fifth switch elements T3 and T5 may be turned off. In the initialization interval X1, the node A may be initialized to the high level driving voltage VDDEL, and the node C may be initialized to the initialization voltage Vinit. At this time, the node D may hold an operation point voltage Voled(F) of the light emitting device EL which is stored in a previous frame.

Referring to FIGS. 9 and 10B, in a pre-bias interval X0, the third switch element T3 may be turned on, and the first, second, fourth, and fifth switch elements T1, T2, T4, and T5 may be turned off. In the pre-bias interval X0, a voltage of the node D may be changed to a pre-data voltage Vdata(P), the node A may hold the high level driving voltage VDDEL, and the node C may hold the initialization voltage Vinit.

Referring to FIGS. 9 and 10C, in a first sampling interval X2, the first, second, and third switch elements T1, T2, and T3 may be turned on, and the fourth and fifth switch elements T4 and T5 may be turned off. In the first sampling interval X2, a voltage of the node D may be changed to the data voltage Vdata, and a voltage of the node A may be changed to "Vdata+Vth" by the driving element DT which operates as a diode. Here, "Vth" may be a threshold voltage of the light emitting device DT. In addition, a voltage of the node C may maintain the initialization voltage Vinit.

Referring to FIGS. 9 and 10D, in a second sampling interval X3, the first and second switch elements T1 and T2 may be turned on, and the third, fourth, and fifth switch elements T3, T4, and T5 may be turned off. In the second sampling interval X3, a voltage of the node D may maintain the data voltage Vdata, and a voltage of the node A may be changed to "Vdata+Vth−ΔVss" by the driving element DT which operates as a diode. Here, "ΔVss" may be a subthreshold slope deviation compensation voltage of the light emitting device DT. In addition, a voltage of the node C may maintain the initialization voltage Vinit.

Referring to FIGS. 9 and 10E, in an emission interval X4, the first, second, and third switch elements T1, T2, and T3 may be turned off, and the fourth and fifth switch elements T4 and T5 may be turned on. In the emission interval X4, a voltage of the node C and a voltage of the node D may be changed to an operation point voltage Voled of the light emitting device EL, and a voltage of the node A may be changed to "Vdata+Vth−ΔVss+Voled−Vinit" by a coupling operation of the storage capacitor Cst.

In the emission interval X4, a driving current Iel supplied to the light emitting device EL may be $K(Vgs-Vth)^2$. Here, K may be a proportional constant which is determined by the electron mobility, parasitic capacitance, and channel capacity of the driving element DT, and Vgs may be a gate-source voltage of the driving element DT (i.e., a difference voltage between a voltage of the node A and a voltage of the node D) in the emission interval X4.

Therefore, in the emission interval X4, the driving current Iel supplied to the light emitting device EL may be $K(Vdata-\Delta Vss-Vinit)^2$. As seen in such an equation, the driving current Iel may not be affected by a variation of the threshold voltage Vth of the driving element DT and may be compensated for to be lower by a subthreshold slope deviation compensation voltage (ΔVss) of the light emitting device DT, and thus, may prevent the partial detachment of a black gray level and a smear phenomenon caused by a defect issue (i.e., insufficiency of a sampling time) which occurs when the electron mobility of the driving element is low.

Figures 11, 12:
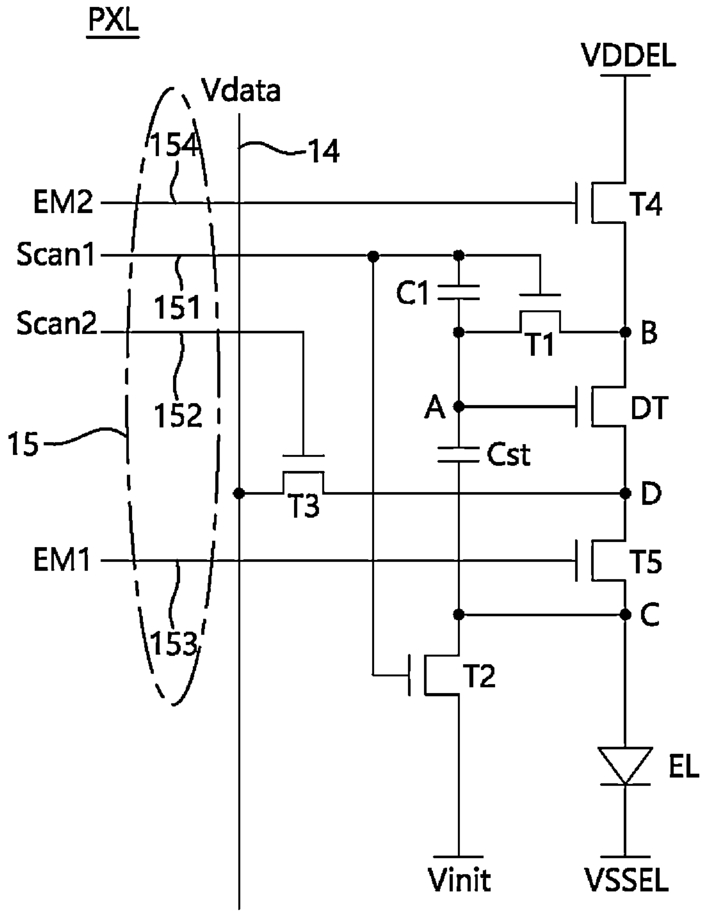
FIG. 11 is a diagram illustrating a first modification example of the pixel of FIG. 4A.
FIG. 12 is an example of a diagram illustrating voltages of pixel nodes of FIG. 11 in X1, X2, X3, and X4 of FIG. 5 when a first modification pixel of FIG. 11 is driven based on the first driving waveform of FIG. 5.

FIG. 11 is a diagram illustrating a first modification example of the pixel of FIG. 4A.

Comparing with the pixel PXL of FIG. 4A, a first modification pixel PXL of FIG. 11 may have a difference in that the first modification pixel PXL further includes a first capacitor C1 connected to a first scan line 151 and a node A. In the first modification pixel PXL of FIG. 11, the elements except the first capacitor C1 and any associated elements may be substantially the same as or similar to those of FIG. 4A, and thus, their repetitive descriptions may be omitted for brevity.

As the first modification pixel PXL of FIG. 11 operates based on the first driving waveform of FIG. 5, an operation of compensating for a threshold voltage deviation of a driving element DT and an operation of compensating for a subthreshold slope deviation of the driving element DT may be further performed in a pixel programming operation and a gate-source voltage of the driving element DT may be further lowered by a kickback voltage based on the first capacitor C1, and thus, the partial detachment of a black gray level and a smear phenomenon caused by insufficiency of a sampling time may be more effectively reduced. The kickback voltage based on the first capacitor C1 may be generated at a time at which a first scan signal Scan1 is shifted from an on level to an off level in FIG. 5.

Figure 13A:
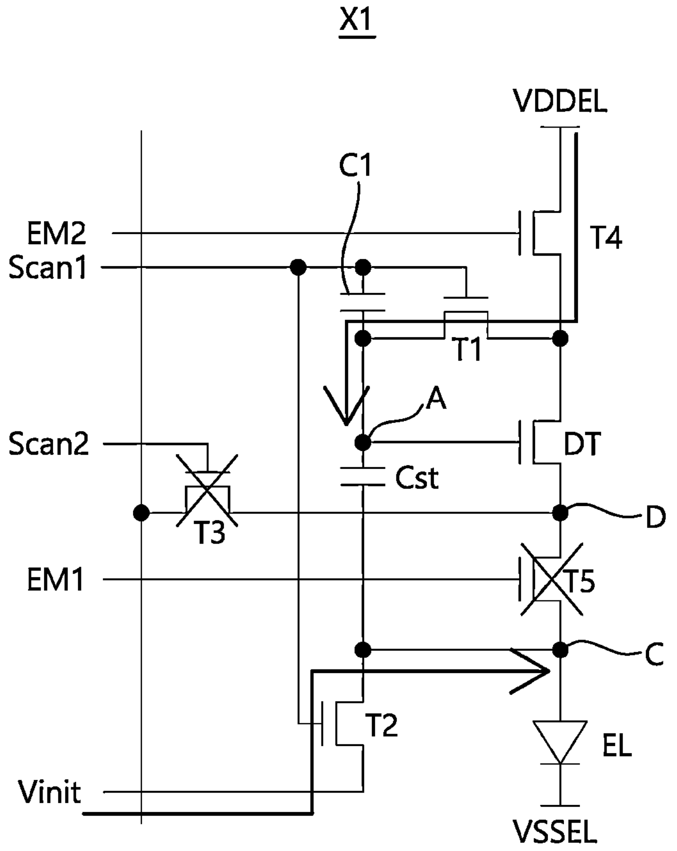
FIG. 13A is an example of a diagram illustrating an operation of the first modification pixel in the initialization interval of FIG. 5.
Figure 13B:
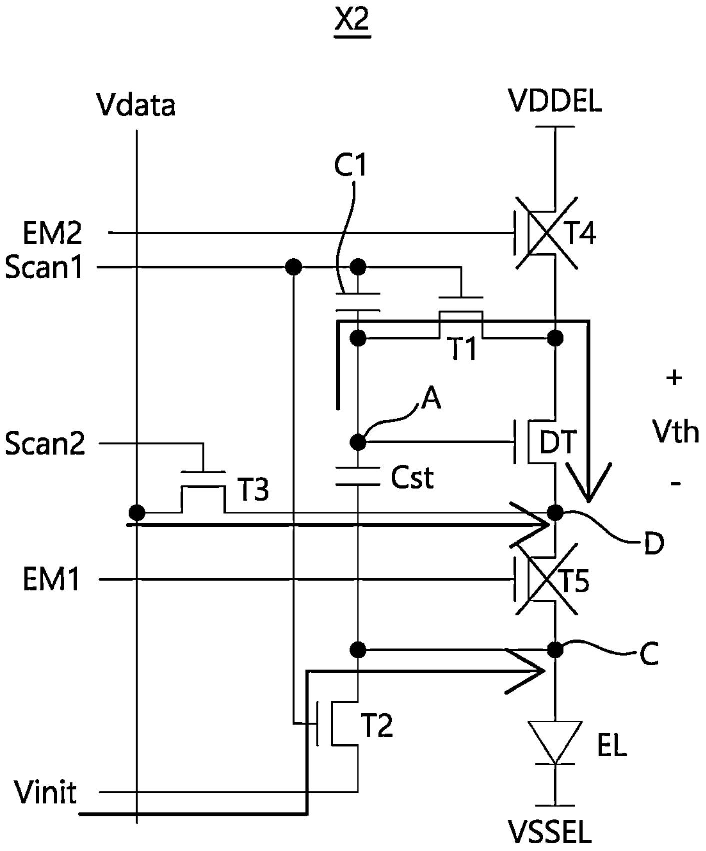
FIG. 13B is an example of a diagram illustrating an operation of the first modification pixel in the first sampling interval of FIG. 5.
Figure 13C:
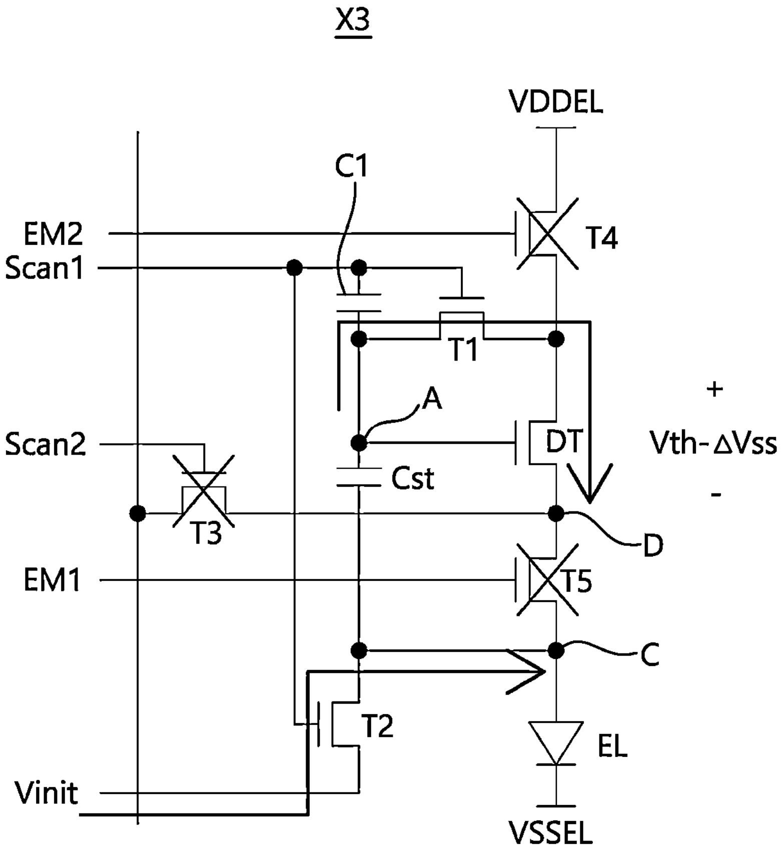
FIG. 13C is an example of a diagram illustrating an operation of the first modification pixel in the second sampling interval of FIG. 5.
Figure 13D:
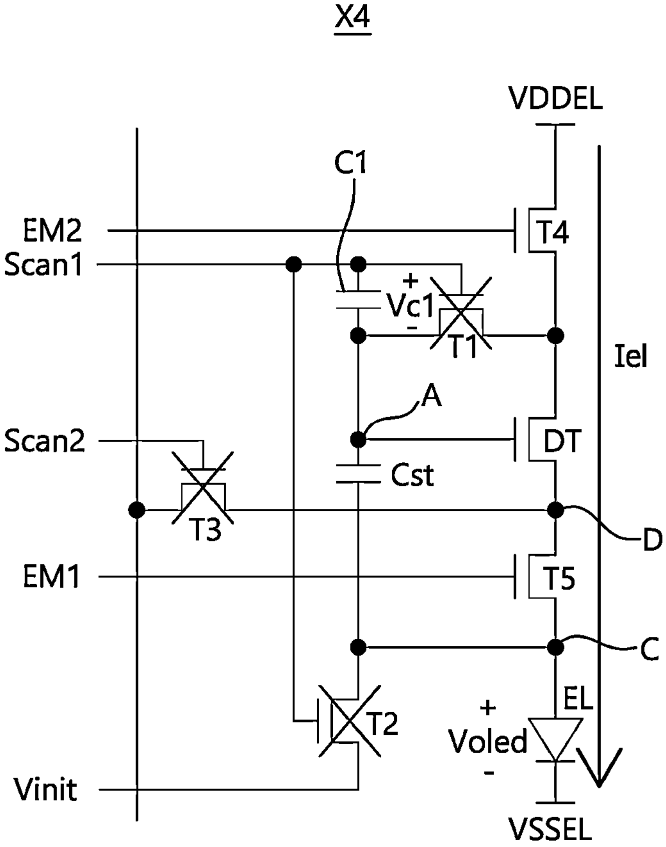
FIG. 13D is an example of a diagram illustrating an operation of the first modification pixel in the emission interval of FIG. 5.

FIG. 12 is an example of a diagram illustrating voltages of pixel nodes of FIG. 11 in X1, X2, X3, and X4 of FIG. 5 when a first modification pixel of FIG. 11 is driven based on the first driving waveform of FIG. 5. FIG. 13A is an example of a diagram illustrating an operation of the first modification pixel in the initialization interval of FIG. 5. FIG. 13B is an example of a diagram illustrating an operation of the first modification pixel in the first sampling interval of FIG. 5. FIG. 13C is an example of a diagram illustrating an operation of the first modification pixel in the second sampling interval of FIG. 5. FIG. 13D is an example of a diagram illustrating an operation of the first modification pixel in the emission interval of FIG. 5.

Referring to FIGS. 12 and 13A, in an initialization interval X1, the first, second, and fourth switch elements T1, T2, and T4 may be turned on, and the third and fifth switch elements T3 and T5 may be turned off. In the initialization interval X1, the node A may be initialized to the high level driving voltage VDDEL, and the node C may be initialized to the initialization voltage Vinit. At this time, the node D may hold an operation point voltage Voled(F) of the light emitting device EL which is stored in a previous frame.

Referring to FIGS. 12 and 13B, in a first sampling interval X2, the first, second, and third switch elements T1, T2, and T3 may be turned on, and the fourth and fifth switch elements T4 and T5 may be turned off. In the first sampling interval X2, a voltage of the node D may be changed to the data voltage Vdata, and a voltage of the node A may be changed to "Vdata'+Vth" by the driving element DT which operates as a diode. Here, "Vth" may be a threshold voltage of the light emitting device DT, and "Vdata'" may be an insufficient sampling voltage generated due to sampling insufficiency when the electron mobility of the driving element DT is low and may be higher than the data voltage Vdata. In addition, a voltage of the node C may maintain the initialization voltage Vinit.

Referring to FIGS. 12 and 13C, in a second sampling interval X3, the first and second switch elements T1 and T2 may be turned on, and the third, fourth, and fifth switch elements T3, T4, and T5 may be turned off. In the second sampling interval X3, a voltage of the node D may be changed to the insufficient sampling voltage Vdata', and a voltage of the node A may be changed to "Vdata'+Vth−ΔVss" by the driving element DT which operates as a diode. Here, "ΔVss" may be a subthreshold slope deviation compensation voltage of the light emitting device DT. In addition, a voltage of the node C may maintain the initialization voltage Vinit.

Referring to FIGS. 12 and 13D, in an emission interval X4, the first, second, and third switch elements T1, T2, and T3 may be turned off, and the fourth and fifth switch elements T4 and T5 may be turned on. In the emission interval X4, a voltage of the node C and a voltage of the node D may be changed to an operation point voltage Voled of the light emitting device EL, and a voltage of the node A may be changed to "Vdata'+Vth−ΔVss+Voled−Vinit−Vc1" by a coupling operation of the storage capacitor Cst. Here, "Vc1" may be a kickback voltage which is generated when the first scan signal Scan1 is shifted to an off level, in the emission interval X4.

In the emission interval X4, a driving current Iel supplied to the light emitting device EL may be $K(Vgs-Vth)^2$. Here, K may be a proportional constant which is determined by the electron mobility, parasitic capacitance, and channel capacity of the driving element DT, and Vgs may be a gate-source voltage of the driving element DT (i.e., a difference voltage between a voltage of the node A and a voltage of the node D) in the emission interval X4.

In the emission interval X4, the driving current Iel supplied to the light emitting device EL may be $K(Vdata'-\Delta Vss-Vinit-Vc1)^2$. As seen in such an equation, the driving current Iel may not be affected by a variation of the threshold voltage Vth of the driving element DT and may be compensated for to be lower by a subthreshold slope deviation compensation voltage (ΔVss) of the light emitting device DT. Furthermore, the driving current Iel may be compensated for to be lower by the kickback voltage when the first scan signal Scan1 is shifted to an off level. Accordingly, the partial detachment of a black gray level and a smear phenomenon, caused by a defect issue (i.e., insufficiency of a sampling time) which occurs when the electron mobility of the driving element is low, may be more effectively reduced.

Figures 14, 15:
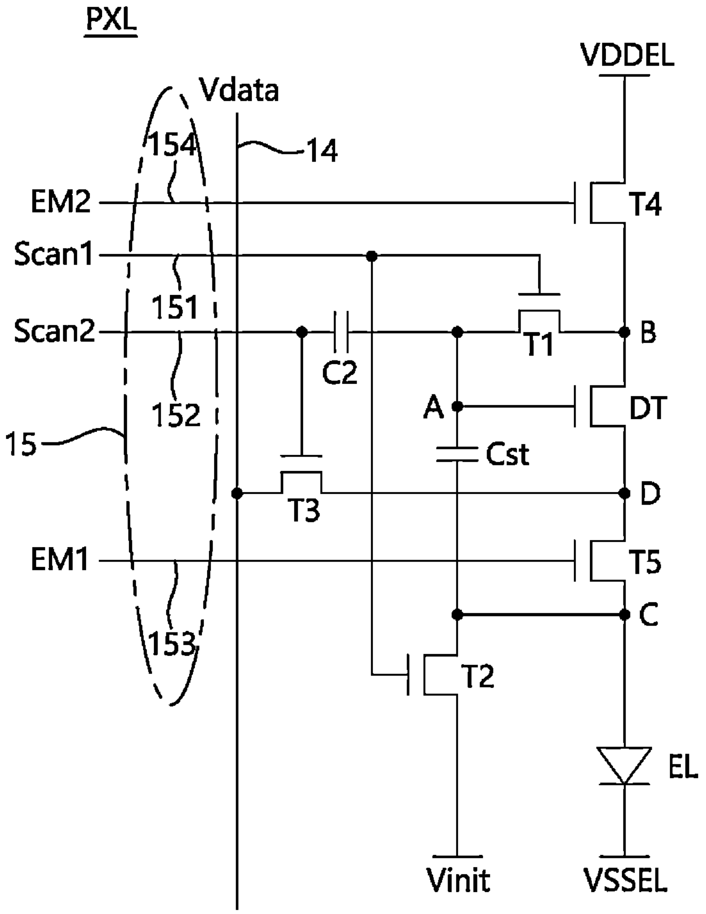
FIG. 14 is a diagram illustrating a second modification example of the pixel of FIG. 4A.
FIG. 15 is an example of a diagram illustrating voltages of the pixel nodes of FIG. 11 in X1, X0, X2, X3, and X4 of FIG. 8 when a second modification pixel of FIG. 14 is driven based on the second driving waveform of FIG. 8.

FIG. 14 is a diagram illustrating a second modification example of the pixel of FIG. 4A.

Comparing with the pixel PXL of FIG. 4A, a second modification pixel PXL of FIG. 14 may have a difference in that the second modification pixel PXL further includes a second capacitor C2 connected to a second scan line 152 and a node A. In the second modification pixel PXL of FIG. 14, the elements except the second capacitor C2 and any associated elements may be substantially the same as or similar to those of FIG. 4A, and thus, their repetitive descriptions may be omitted for brevity.

As the second modification pixel PXL of FIG. 14 operates based on the second driving waveform of FIG. 8, an operation of compensating for a threshold voltage deviation of a driving element DT and an operation of compensating for a subthreshold slope deviation of the driving element DT may be further performed in a pixel programming operation, and thus, a hysteresis deviation of the driving element DT may be reduced.

Furthermore, the second modification pixel PXL may further increase the gate-source voltage of the driving element DT on the basis of a coupling voltage based on the second capacitor C2, and thus, may increase a sampling current, thereby more effectively decreasing the partial detachment of a black gray level and a smear phenomenon caused by insufficiency of a sampling time. The coupling voltage based on the second capacitor C2 may be generated within an interval where the second scan signal Scan2 is maintained at an on level in FIG. 8.

Figure 16A:
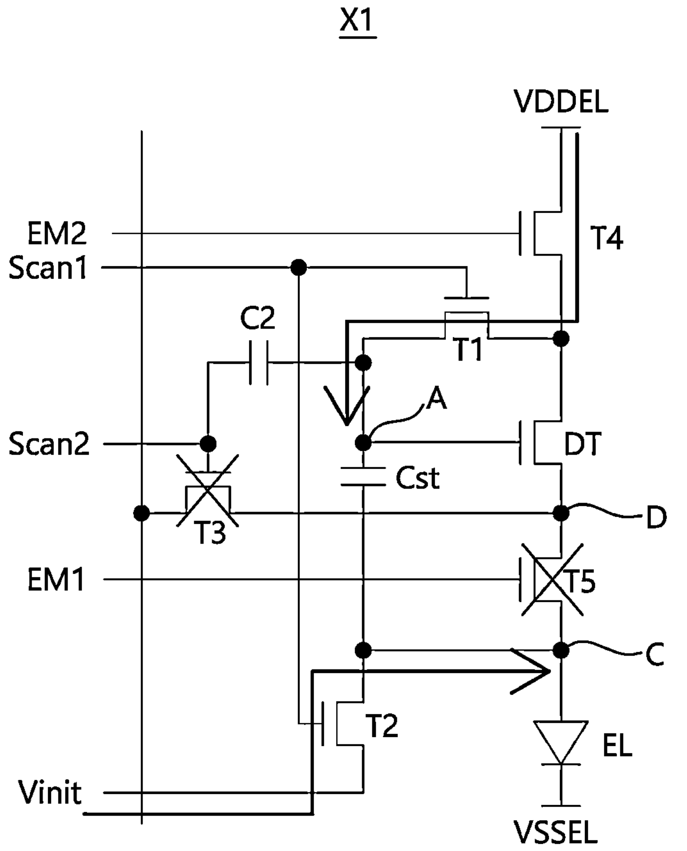
FIG. 16A is an example of a diagram illustrating an operation of the second modification pixel in the initialization interval of FIG. 8.
Figure 16B:
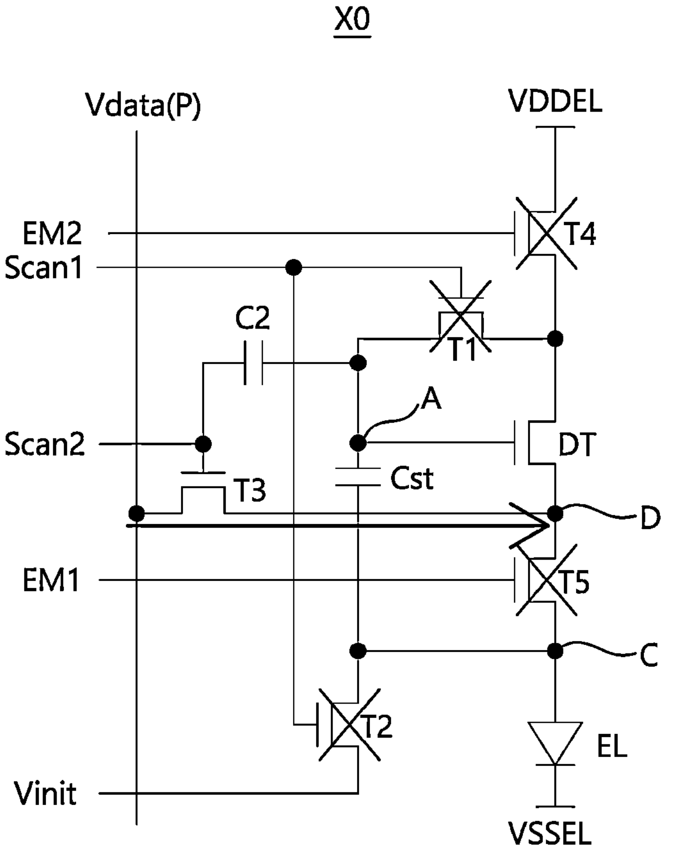
FIG. 16B is an example of a diagram illustrating an operation of the second modification pixel in the pre-bias interval of FIG. 8.
Figure 16C:
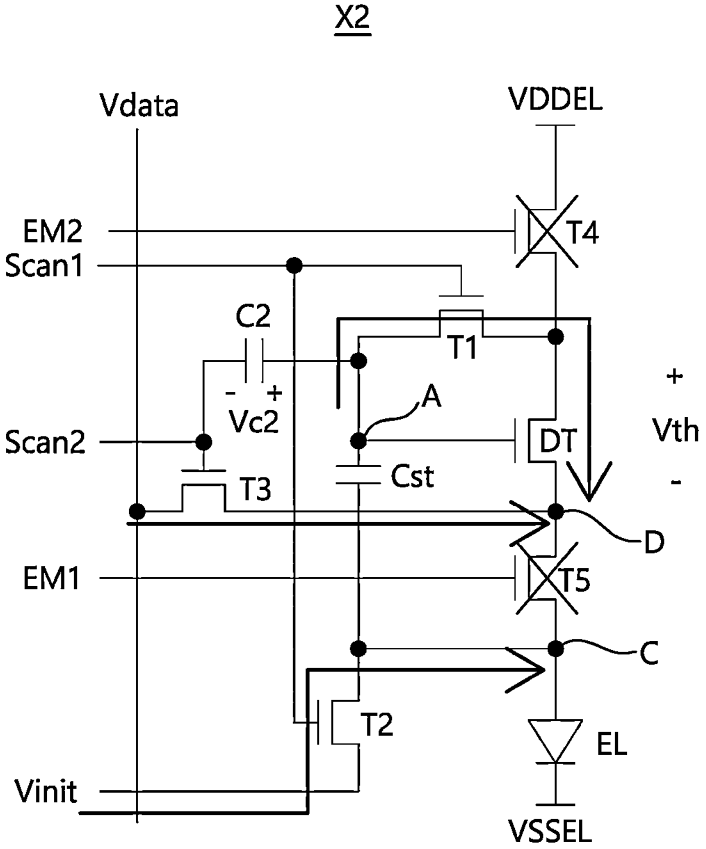
FIG. 16C is an example of a diagram illustrating an operation of the second modification pixel in the first sampling interval of FIG. 8.
Figure 16D:
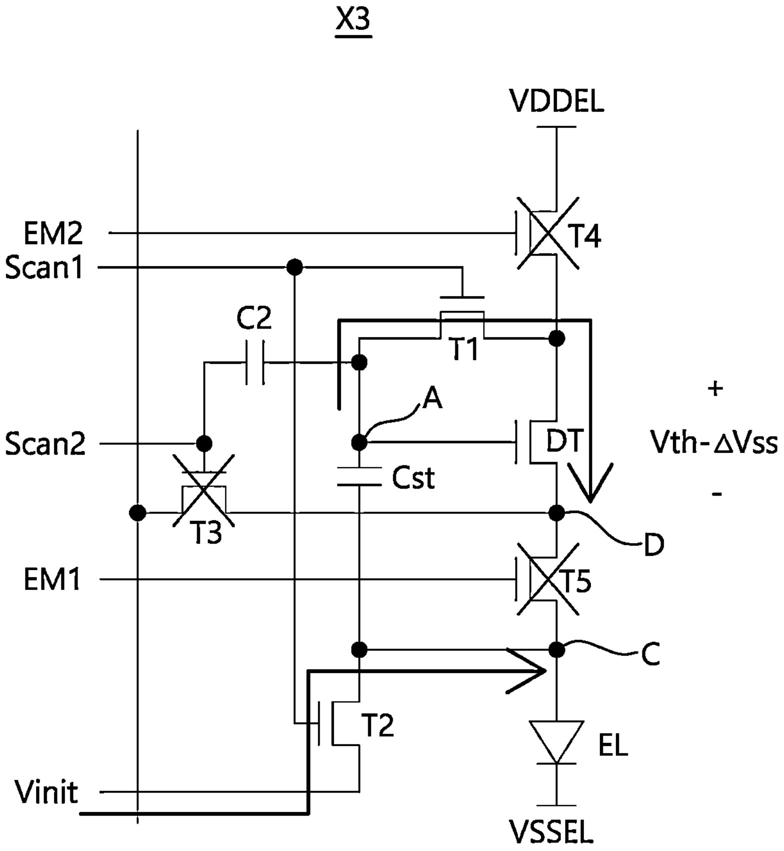
FIG. 16D is an example of a diagram illustrating an operation of the second modification pixel in the second sampling interval of FIG. 8.
Figure 16E:
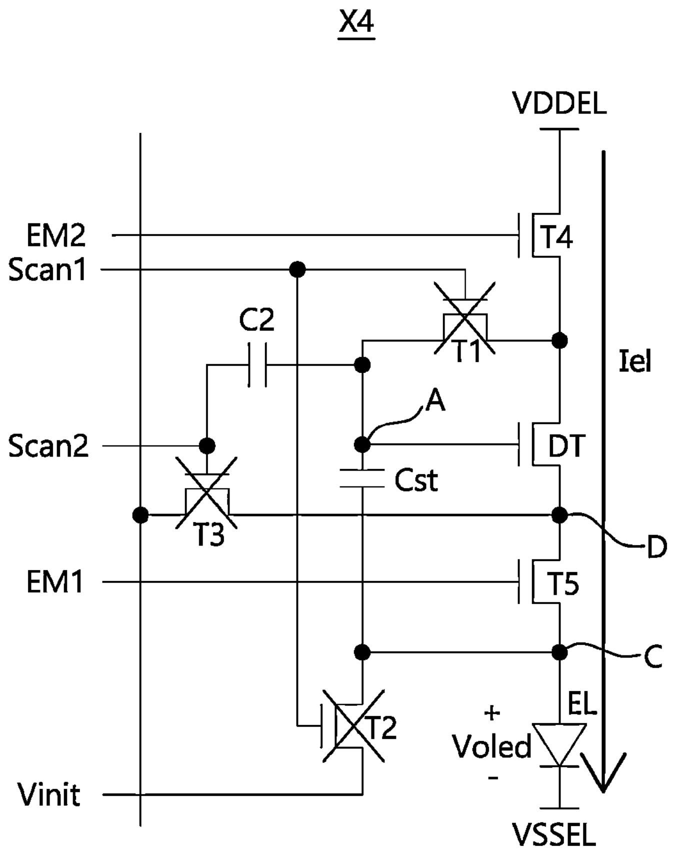
FIG. 16E is an example of a diagram illustrating an operation of the second modification pixel in the emission interval of FIG. 8.

FIG. 15 is an example of a diagram illustrating voltages of the pixel nodes of FIG. 11 in X1, X0, X2, X3, and X4 of FIG. 8 when a second modification pixel of FIG. 14 is driven based on the second driving waveform of FIG. 8. FIG. 16A is an example of a diagram illustrating an operation of the second modification pixel in the initialization interval of FIG. 8. FIG. 16B is an example of a diagram illustrating an operation of the second modification pixel in the pre-bias interval of FIG. 8. FIG. 16C is an example of a diagram illustrating an operation of the second modification pixel in the first sampling interval of FIG. 8. FIG. 16D is an example of a diagram illustrating an operation of the second modification pixel in the second sampling interval of FIG. 8. FIG. 16E is an example of a diagram illustrating an operation of the second modification pixel in the emission interval of FIG. 8.

Referring to FIGS. 15 and 16A, in an initialization interval X1, the first, second, and fourth switch elements T1, T2, and T4 may be turned on, and the third and fifth switch elements T3 and T5 may be turned off. In the initialization interval X1, the node A may be initialized to the high level driving voltage VDDEL, and the node C may be initialized to the initialization voltage Vinit. At this time, the node D may hold an operation point voltage Voled(F) of the light emitting device EL which is stored in a previous frame.

Referring to FIGS. 15 and 16B, in a pre-bias interval X0, the third switch element T3 may be turned on, and the first, second, fourth, and fifth switch elements T1, T2, T4, and T5 may be turned off. In the pre-bias interval X0, a voltage of the node D may be changed to a pre-data voltage Vdata(P), the node A may hold the high level driving voltage VDDEL, and the node C may hold the initialization voltage Vinit.

Referring to FIGS. 15 and 16C, in a first sampling interval X2, the first, second, and third switch elements T1, T2, and T3 may be turned on, and the fourth and fifth switch elements T4 and T5 may be turned off. In the first sampling interval X2, a voltage of the node D may be changed to the data voltage Vdata, and a voltage of the node A may be changed to "Vdata'+Vth+Vc2" by a diode connection operation of the driving element DT and a coupling operation of the second capacitor C2. Here, "Vth" may be a threshold voltage of the light emitting device DT, and "Vdata'" may be an insufficient sampling voltage generated due to sampling insufficiency when the electron mobility of the driving element DT is low and may be higher than the data voltage Vdata. In addition, "Vc2" may be a coupling voltage based on the second capacitor C2 in the first sampling interval X2. Comparing with a case where the coupling voltage Vc2 is not applied, the gate-source voltage of the driving element DT may further increase, and a sampling current may increase. In addition, a voltage of the node C may maintain the initialization voltage Vinit.

Referring to FIGS. 15 and 16D, in a second sampling interval X3, the first and second switch elements T1 and T2 may be turned on, and the third, fourth, and fifth switch elements T3, T4, and T5 may be turned off. In the second sampling interval X3, a voltage of the node D may be changed to a middle sampling voltage Vdata", and a voltage of the node A may be changed to "Vdata"+Vth−ΔVss" by the driving element DT which operates as a diode. Here, the middle sampling voltage Vdata" may be a sampling result based on the increased sampling current and may be higher than the insufficient sampling voltage Vdata' and lower than the data voltage Vdata. In addition, "ΔVss" may be a subthreshold slope deviation compensation voltage of the light emitting device DT. In addition, a voltage of the node C may maintain the initialization voltage Vinit.

Referring to FIGS. 15 and 16E, in an emission interval X4, the first, second, and third switch elements T1, T2, and T3 may be turned off, and the fourth and fifth switch elements T4 and T5 may be turned on. In the emission interval X4, a voltage of the node C and a voltage of the node D may be changed to an operation point voltage Voled of the light emitting device EL, and a voltage of the node A may be changed to "Vdata"+Vth−ΔVss+Voled−Vinit" by a coupling operation of the first capacitor C1.

In the emission interval X4, a driving current Iel supplied to the light emitting device EL may be $K(Vgs-Vth)^2$. Here, K may be a proportional constant which is determined by the electron mobility, parasitic capacitance, and channel capacity of the driving element DT, and Vgs may be a gate-source voltage of the driving element DT (i.e., a difference voltage between a voltage of the node A and a voltage of the node D) in the emission interval X4.

In the emission interval X4, the driving current Iel supplied to the light emitting device EL may be $K(Vdata''-\Delta Vss-Vinit)^2$. As seen in such an equation, the driving current Iel may not be affected by a variation of the threshold voltage Vth of the driving element DT and may be compensated for to be lower by a subthreshold slope deviation compensation voltage (ΔVss) of the light emitting device DT. Furthermore, because the driving current Iel depends on the middle sampling voltage Vdata" based on a sufficient sampling current, the partial detachment of a black gray level and a smear phenomenon, caused by a defect issue (i.e., insufficiency of a sampling time) which occurs when the electron mobility of the driving element is low, may be more effectively reduced.

An electroluminescent display apparatus according to one or more example embodiments of the present disclosure may perform a programming operation of setting a driving current prior to an emission operation at every frame, with respect to a pixel enabling a threshold voltage of a driving element to be compensated for.

An electroluminescent display apparatus according to one or more example embodiments of the present disclosure may modify a driving waveform of a gate signal to further include a second sampling interval for compensating for a subthreshold slope deviation of a driving element in addition to a first sampling interval for compensating for a threshold voltage deviation of the driving element in a programming operation, and thus, may prevent the partial detachment of a black gray level and a smear phenomenon caused by a defect issue (i.e., insufficiency of a sampling time) which occurs when the electron mobility of the driving element is low.

Furthermore, an electroluminescent display apparatus according to one or more example embodiments of the present disclosure may modify a driving waveform of a gate signal to further include a pre-bias interval preceding a first sampling interval, and thus, may previously decrease a hysteresis deviation of a driving element and may more accurately compensate for a threshold voltage deviation and a subthreshold slope deviation of the driving element, thereby effectively solving a defect issue occurring when the electron mobility of the driving element is low.

Furthermore, an electroluminescent display apparatus according to one or more example embodiments of the present disclosure may further include a first capacitor added to a pixel enabling the threshold voltage of the driving element to be compensated for and may further reduce a gate-source voltage of the driving element by using a coupling voltage (a kickback voltage) based on the first capacitor after a sampling operation of compensating for a deviation, thereby more effectively decreasing the partial detachment of a black gray level and a smear phenomenon caused by insufficiency of a sampling time.

Furthermore, an electroluminescent display apparatus according to one or more example embodiments of the present disclosure may further include a second capacitor added to a pixel enabling the threshold voltage of the driving element to be compensated for and may further increase the gate-source voltage of the driving element by using a coupling voltage based on the second capacitor in performing a sampling operation of compensating for a deviation, and thus, may increase a sampling current, thereby preventing the partial detachment of a black gray level and a smear phenomenon within a limited sampling time.

The effects according to one or more example embodiments of the present disclosure are not limited to the above examples, and other various effects are within the scope of this present disclosure.

While the present disclosure has been particularly shown and described with reference to exemplary embodiments thereof, it will be understood by those of ordinary skill in the art that various modifications and variations in form and details may be made without departing from the spirit and scope of the present disclosure. Thus, it is intended that the present disclosure covers the modifications and variations of this disclosure provided they come within the scope of the appended claims and their equivalents.

What is claimed is:

1. An electroluminescent display apparatus, comprising:

a display panel including a plurality of pixels;

a gate driving circuit configured to drive scan lines and emission lines connected to the plurality of pixels; and a data driving circuit configured to drive data lines connected to the plurality of pixels, wherein a first pixel of the plurality of pixels comprises:

a light emitting device connected to a third node and an input terminal for a low level driving voltage;

a driving element including a gate electrode connected to a first node, a drain electrode connected to a second node, and a source electrode connected to a fourth node, the driving element configured to generate a driving current which is to be supplied to the light emitting device, the driving element having an N metal oxide semiconductor field effect transistor type structure;

a first switch element connected between the first node and the second node;

a second switch element connected between the third node and an input terminal for an initialization voltage;

a third switch element connected between the fourth node and a first data line of the data lines;

a fourth switch element connected between the second node and an input terminal for a high level driving voltage;

a fifth switch element connected between the fourth node and the third node;

a storage capacitor connected between the first node and the third node; and a second capacitor connected to the first node and a gate electrode of the third switch element, wherein:

a gate electrode of the first switch element and a gate electrode of the second switch element are connected to a first scan line of the scan lines, the first scan line configured to transfer a first scan signal;

the gate electrode of the third switch element is connected to a second scan line of the scan lines, the second scan line configured to transfer a second scan signal;

a gate electrode of the fifth switch element is connected to a first emission line of the emission lines, the first emission line configured to transfer a first emission signal;

a gate electrode of the fourth switch element is connected to a second emission line of the emission lines, the second emission line configured to transfer a second emission signal;

the first scan signal and the second scan signal have different pulse forms and different phases; and the first emission signal and the second emission signal have a same pulse form and different phases, wherein one frame period for driving the first pixel comprises:

an initialization interval for initializing the first node and the third node;

a first sampling interval for succeeding the initialization interval, sampling a threshold voltage of the driving element, and storing the sampled threshold voltage in the first node;

a second sampling interval for succeeding the first sampling interval, sampling a subthreshold slope deviation compensation voltage of the driving element, and storing the sampled subthreshold slope deviation compensation voltage in the first node; and an emission interval for succeeding the second sampling interval and supplying the light emitting device with a driving current based on a gate-source voltage of the driving element to drive the light emitting device, wherein:

in the first sampling interval and the second sampling interval, the first node and the fourth node are for being short-circuited;

in the emission interval, the gate-source voltage of the driving element is a difference voltage between a voltage of the first node and a voltage of the fourth node; and the gate-source voltage of the driving element comprises the sampled threshold voltage of the driving element, the sampled subthreshold slope deviation compensation voltage of the driving element, a data voltage supplied through the first data line, and the initialization voltage, wherein the one frame period for driving the first pixel further comprises:

a pre-bias interval where a pre-data voltage supplied through the first data line is to be supplied to the fourth node prior to the data voltage so as to decrease a hysteresis deviation of the driving element, the pre-bias interval being arranged between the initialization interval and the first sampling interval, the pre-data voltage being a data voltage which is to be applied to a second pixel connected to the first data line, the first and second pixels being adjacent pixels;

a first transition interval arranged between the initialization interval and the pre-bias interval; and a second transition interval arranged between the emission interval and the second sampling interval, wherein:

the first scan signal has an on level in the initialization interval, has an off level in the first transition interval and the pre-bias interval subsequent thereto, has an on level in the first sampling interval and the second sampling interval subsequent thereto, and has an off level in the second transition interval and the emission interval subsequent thereto;

the second scan signal has an off level in the initialization interval and the first transition interval, has an on level in the pre-bias interval and the first sampling interval subsequent thereto, and has an off level up to the emission interval from the second sampling interval subsequently thereto;

the first emission signal has an off level up to a specific timing of the second transition interval from the initialization interval and has an on level up to the emission interval from after the specific timing of the second transition interval; and the second emission signal has an on level in the initialization interval and the first transition interval, has an off level up to the second transition interval from the pre-bias interval subsequently thereto, and has an on level in the emission interval subsequent thereto, and wherein a voltage between the first node and the fourth node is increased by using a coupling voltage based on the second capacity to increase a sampling current in the first sampling interval, the coupling voltage based on the second capacity being generated within an interval where the second scan signal is maintained at an on level which enables the third switch element to connect the fourth node and the first data line of the data lines.

2. The electroluminescent display apparatus of claim 1, wherein the first scan signal is supplied to two adjacent pixel rows with different phases, the second scan signal is supplied to the two adjacent pixel rows with different phases, the first emission signal is supplied to the two adjacent pixel rows with a same phase, and the second emission signal is supplied to the two adjacent pixel rows with a same phase.

3. The electroluminescent display apparatus of claim 1, wherein the first scan signal is supplied to two adjacent pixel rows with a same phase, the second scan signal is supplied to the two adjacent pixel rows with different phases, the first emission signal is supplied to the two adjacent pixel rows with a same phase, and the second emission signal is supplied to the two adjacent pixel rows with a same phase, and the two adjacent pixel rows are among the plurality of pixels.

4. The electroluminescent display apparatus of claim 1, wherein the first pixel is arranged in a first pixel row among the plurality of pixels, the second pixel is arranged in a second pixel row among the plurality of pixels, and the first and second pixel rows are adjacent pixel rows.

* * * * *